US012807334B2

(12) United States Patent
Nakamura et al.

(10) Patent No.: US 12,807,334 B2
(45) Date of Patent: Nov. 24, 2026

(54) SATELLITE LASER FUSION SYSTEM AND METHOD

(71) Applicant: Blue Laser Fusion Inc., Palo Alto, CA (US)

(72) Inventors: Shuji Nakamura, Palo Alto, CA (US); Hiroaki Ohta, Palo Alto, CA (US)

(73) Assignee: Blue Laser Fusion Inc., Palo Alto, CA (US)

( * ) Notice: Subject to any disclaimer, the term of this patent is extended or adjusted under 35 U.S.C. 154(b) by 610 days.

(21) Appl. No.: 18/150,682

(22) Filed: Jan. 5, 2023

(65) Prior Publication Data

US 2024/0158106 A1 May 16, 2024

Related U.S. Application Data

(60) Provisional application No. 63/424,779, filed on Nov. 11, 2022.

(51) Int. Cl.

*B64G 1/42* (2006.01)
*B64G 1/10* (2006.01)
*G21B 1/03* (2006.01)
*G21B 1/23* (2006.01)

(52) U.S. Cl.

CPC ............. *B64G 1/422* (2013.01); *B64G 1/105* (2013.01); *G21B 1/03* (2013.01); *G21B 1/23* (2013.01)

(58) Field of Classification Search

CPC ........................................................ G21B 1/03
See application file for complete search history.

(56) References Cited

U.S. PATENT DOCUMENTS 4,205,278 A * 5/1980 George .................... H01S 3/235 372/74
4,639,348 A * 1/1987 Jarnagin .................. G21B 1/15 376/127
5,168,400 A 12/1992 Moses
8,208,508 B2 6/2012 Deri et al.
9,036,765 B2 * 5/2015 Birnbach ................. G21B 1/00 376/105
9,171,646 B2 10/2015 Moses et al.
10,410,752 B2 9/2019 Hora (Continued)

FOREIGN PATENT DOCUMENTS

JP 08064897 A 3/1996
JP 11261140 A 9/1999

(Continued)

OTHER PUBLICATIONS

Orth, Charles D. Vista—A Vehicle for Interplanetary Space Transport Application Powered by Inertial Confinement Fusion. No. UCRL-TR-110500. Lawrence Livermore National Lab.(LLNL), Livermore, CA (United States), 2005. (Year: 2005).*

(Continued)

*Primary Examiner* — Lily C Garner
(74) *Attorney, Agent, or Firm* — Richard T. Ogawa; Ogawa P.C.

(57) ABSTRACT

In an example, the present invention provides a reactor system for a space application. The system has a reactor comprising a fusion material, and at least one satellite system positioned in an orbit above a geographical location of a planet. In an example, the satellite system is operably coupled to the reactor including the fusion material.

18 Claims, 20 Drawing Sheets

(56) References Cited

U.S. PATENT DOCUMENTS

| | | | | |
|---|---|---|---|---|
| 10,475,541 | B2 * | 11/2019 | Galloway | G21B 1/03 |
| 10,476,226 | B2 | 11/2019 | Bayramian et al. | |
| 10,660,192 | B2 | 5/2020 | Campbell et al. | |
| 11,387,007 | B2 | 7/2022 | Moses et al. | |
| 11,784,454 | B1 * | 10/2023 | Nakamura | H02N 2/028 372/92 |
| 2003/0002610 | A1 | 1/2003 | Panarella | |
| 2003/0179784 | A1 | 9/2003 | Minehara et al. | |
| 2004/0141578 | A1 | 7/2004 | Enfinger | |
| 2009/0000268 | A1 | 1/2009 | Yurash | |
| 2011/0235669 | A1 | 9/2011 | Deri et al. | |
| 2011/0261919 | A1 | 10/2011 | Sefcik et al. | |
| 2013/0064340 | A1 | 3/2013 | Latkowski et al. | |
| 2013/0215925 | A1 | 8/2013 | Kaster et al. | |
| 2014/0138359 | A1 | 5/2014 | Carr et al. | |
| 2014/0348283 | A1 | 11/2014 | Perkins et al. | |
| 2016/0290223 | A1 * | 10/2016 | Mills | F02B 51/02 |
| 2018/0047464 | A1 * | 2/2018 | Drexler | G21B 1/19 |
| 2018/0211732 | A1 | 7/2018 | Perkins | |
| 2020/0091672 | A1 | 3/2020 | Pronin et al. | |
| 2022/0281621 | A1 * | 9/2022 | Clague | G21K 1/093 |

FOREIGN PATENT DOCUMENTS

| | | | |
|---|---|---|---|
| JP | 2002-255501 | A | 9/2002 |
| KR | 10-2017-0116295 | A | 10/2017 |
| WO | 2011029031 | A1 | 3/2011 |
| WO | 2012064767 | A1 | 5/2012 |
| WO | 2013070683 | A1 | 5/2013 |
| WO | 2013133885 | A1 | 9/2013 |
| WO | 2013165469 | A2 | 11/2013 |
| WO | 2014113100 | A2 | 7/2014 |
| WO | 2014130127 | A2 | 8/2014 |
| WO | 2014160128 | A1 | 10/2014 |
| WO | 2015021403 | A1 | 2/2015 |

OTHER PUBLICATIONS

Peter Russbueldt et al., “Innoslab Amplifiers”, IEEE Journal of Selected Topics in Quantum Electronics, Jan./Feb. 2015, vol. 21, No. 1, pp. 447-463, Art No. 3100117, doi: 10.1109/JSTQE.2014.2333234.

Y. Hosaka et al., “Mode-locked pulse oscillation of a self-resonating enhancement optical cavity” Journal of Physics: Conference Series. 1350. 10.1088/1742-6596/1350/1/012028, Oct. 2016.

International Search Report and Written Opinion for related matter PCT/US2023/079408 mailed Mar. 7, 2024.

European Search Report for related application No. EP 23889790.4 mailed Sep. 30, 2026.

* cited by examiner

Figure 6A

| Materials | Giant magnetostrictive materials | | Piezo materials |
|---|---|---|---|
| | $Tb_{0.3}Dy_{0.7}Fe_{1.9}$ | $SmFe_2$ | |
| expansion coefficient $\Delta l/l$ [ppm] (at magnetic field = 1 kOe) | 1,500 | ~750 | 800 |
| Sound speed [m/sec] | 2,200 | 2,500 | - |
| Induced stress [kg/cm$^2$] | 300 | 240 | 150 |
| Curie temperature [degrees Celsius] | 380±40 | 405 | 180±100 |
| Response time | nanosecond~ millisecond | | ~millisecond |

SATELLITE LASER FUSION SYSTEM AND METHOD

CROSS REFERENCE TO RELATED APPLICATIONS

This application is related to and claims priority to U.S. Provisional Patent Application 63/424,779, filed on Nov. 11, 2022, commonly assigned, and hereby incorporated in its entirety for all purposes.

BACKGROUND OF INVENTION

The present invention relates generally to fusion energy generation techniques. In particular, the present invention provides a system and method for fusion energy using a high intensity pulse laser generation system, and related methods. More particularly, the present invention provides the laser generation system for fusion configured in a satellite system. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

Fusion energy is a type of energy production that occurs when two atomic nuclei fuse together, releasing a large amount of energy in the process. It is considered a potential source of clean and abundant energy, as the fuel for fusion reactions (mainly hydrogen) is abundant on Earth and the reactions produce no greenhouse gases or other harmful pollutants.

There are two main approaches to achieving fusion reactions: inertial confinement fusion (ICF) and magnetic confinement fusion (MCF).

Inertial confinement fusion (ICF) involves using high-energy lasers or particle beams to compress and heat a small pellet of hydrogen fuel, causing it to fusion. The fuel is typically a mixture of deuterium and tritium, two isotopes of hydrogen. The fuel is contained within a small, spherical capsule called a hohlraum, which is placed at the center of a chamber filled with high-energy lasers or particle beams. When the lasers or particle beams are fired at a surface of inside of the hohlraum, they generate X-rays that uniformly heat and compress the fuel inside the hohlraum. This causes the fuel to reach the necessary temperature and pressure conditions for fusion to occur.

The main advantage of ICF is that it can potentially produce fusion reactions with a relatively small amount of fuel and at a relatively low cost. However, the process is still in the experimental stage and there are significant technical challenges to overcome before it can be considered a practical source of energy.

Magnetic confinement fusion (MCF) involves using strong magnetic fields to contain and heat a plasma (a hot, ionized gas) of hydrogen fuel, causing it to fuse. The most common type of MCF is called tokamak fusion, which uses a toroidal (doughnut-shaped) chamber to contain the plasma. The plasma is held in the center of the chamber by strong magnetic fields, which are created by running current through a set of coil windings around the chamber. The plasma is heated by injecting energy into it, either through particle beams or through electromagnetic waves.

The main advantage of MCF is that it has the potential to produce fusion reactions on a larger scale, making it more suitable for generating electricity. However, it is a more complex and costly process than ICF and there are still significant technical challenges to overcome before it can be considered a practical source of energy.

Both ICF and MCF have made significant progress in recent years and there are several experimental facilities around the world working on these technologies. However, achieving sustained fusion reactions with net energy production (meaning the energy produced by the fusion reactions is greater than the energy required to initiate and sustain the reactions) remains a major technical challenge.

There are also other approaches to fusion energy being explored, such as magnetized target fusion and muon-catalyzed fusion. However, these approaches are still in the early stages of development and it is not yet clear if they will be viable as a source of energy.

From the above, fusion energy has the potential to be a clean and abundant source of energy, but significant technical challenges must be overcome before it can be considered a practical source of energy.

SUMMARY OF INVENTION

According to the present invention, techniques related generally to fusion energy generation are provided. In particular, the present invention provides a system and method for fusion energy using a high intensity pulse laser generation system, and related methods. More particularly, the present invention provides the laser generation system for fusion configured in a satellite system. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

In an example, the present invention provides a reactor system for a space application. The system has a reactor comprising a fusion material, and at least one satellite system positioned in an orbit above a geographical location of a planet. In an example, the satellite system is operably coupled to the reactor including the fusion material.

In an example, the system has an optical cavity being maintained in a vacuum of 300 Torr and less and characterized by a length of free space of 10 meters to 10 kilometers and positioned with the satellite system. In an example, the optical cavity is configured to increase an intensity of a laser beam comprising a pulse from a certain of energy power intensity to a higher energy power intensity propagating on a first optical path by circulating or reciprocating at least a portion of the laser beam from a light source having a pulse energy output power of 0.001 milli Joule to 1 Mega Joule on the first optical path. In an example, the system forms a resonator including the optical cavity.

In an example, the system has an optical path modification device coupled to the optical cavity. In an example, the optical path modification device is configured to repeatedly change a spatial direction of the laser beam propagating on the first optical path at a predetermined timing ranging from 0.001 microseconds to 3 seconds with the response time from 1 picosecond to 30 microseconds to cause the laser beam propagating on the first optical path to change a direction to a second optical path that is outside of the first optical path to interact with the fusion material after using a several of mirrors. The optical path modification device is configured to propagate the laser beam on the second optical path generating a high intensity pulse laser.

In an example, the system has at least a pair of mirror devices. At least one of the mirror devices is configured on the satellite system. In an example, each of the mirror devices has a mirror surface area of 1 $cm^2$ and 100,000 $m^2$, and is configured with the optical path modification device and provided within the first optical path. In an example, at least one the mirror device is configured to change a spatial position of the mirror device being coupled to the propagation of the laser beam.

In an example, the system has a timing device configured with the optical path mechanism and having a predetermined frequency to adjust the spatial position of the mirror device such that the timing device is configured to adjust the spatial position of the mirror device after a predetermined number of cycles of the laser beam between at least the pair of mirrors such that each cycle of the laser beam progressively increases an intensity of a pulse of the laser beam.

In an example, the system has a spatial driver device coupled to the timing device and the at least one mirror device configured to adjust the spatial position of the mirror device to move the spatial position of the mirror device from a first position to a second position after the predetermined number of cycles.

In an example, the present invention includes a high-intensity short-pulse laser generation system. The system has a resonator and an optical path changing device coupled to the resonator. The resonator is configured to, by causing at least a part of laser light outputted from a light source to circulate or make a round trip along a first optical path having been determined in advance, enhance an intensity of the laser light propagating along the first optical path. The optical path changing device is coupled to the resonator is configured to, by changing a propagation direction of the laser light propagating along the first optical path repeatedly at a predetermined timing, cause the laser light propagating along the first optical path to propagate onto a second optical path that is not on the first optical path, thereby generating high-intensity short-pulse laser light onto the second optical path.

Of course, one of ordinary skill in the art would recognize other variations, modifications, and alternatives.

Depending upon the example, the present invention can achieve one or more of these benefits and/or advantages. In an example, the present invention provides a fusion energy system configured with a high intensity pulse laser system in a compact and spatially efficient system and related methods. In an example, the high intensity pulse laser system provides enough energy to ignite and sustain fusion energy configured in a space application. In an example, the present invention offers advantages of generating fusion power through an efficient size, weight, and cost using the present high intensity lasers in space. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 3(*a*), 3(*b*) and 3(*c*) is a more detailed diagram of an optical path modification device of FIG. 3 according to an example of the present invention.

FIG. 6A is a table listing magneto-strictive and piezo materials according to examples of the present invention.

DETAILED DESCRIPTION OF THE EXAMPLES

In an example, according to the present invention, techniques related generally to fusion energy generation are provided. In particular, the present invention provides a system and method for fusion energy using a high intensity pulse laser generation system, and related methods. More particularly, the present invention provides the laser generation system for fusion configured in a satellite system. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

In an example, the present invention is configured with a satellite system. In an example, a satellite is a man-made object that is designed to orbit the Earth or another celestial body. It is typically launched into space using a rocket and can be used for a variety of purposes, including communication, weather forecasting, navigation, and scientific research.

Time of flight (TOF) sensors are used to measure the distance between the satellite and other objects, such as the ground or other satellites. These sensors can be used to determine the satellite's position and velocity, as well as to track the movement of other objects.

Thrusters are used to maneuver the satellite in orbit. These can be chemical thrusters, which use propellant to generate thrust, or electric thrusters, which use electricity to ionize a gas and create thrust.

Communication is an essential part of a satellite's function. Satellites use a variety of methods to communicate with the ground, including radio waves, microwaves, and laser beams. They may also use antennas to transmit and receive signals.

Processors are used to control the satellite's functions and to process data that is collected by the satellite's sensors. These can range from simple microcontrollers to more advanced computer systems.

Other features that may be included on a satellite include solar panels to provide power, sensors to collect data on the environment or celestial bodies, and payloads such as cameras or scientific instruments. Some satellites may also be equipped with shields to protect against radiation or other environmental hazards. Further details of the present laser fusion system as applied to a satellite system can be found throughout the present specification and more particularly below.

Figure 1:
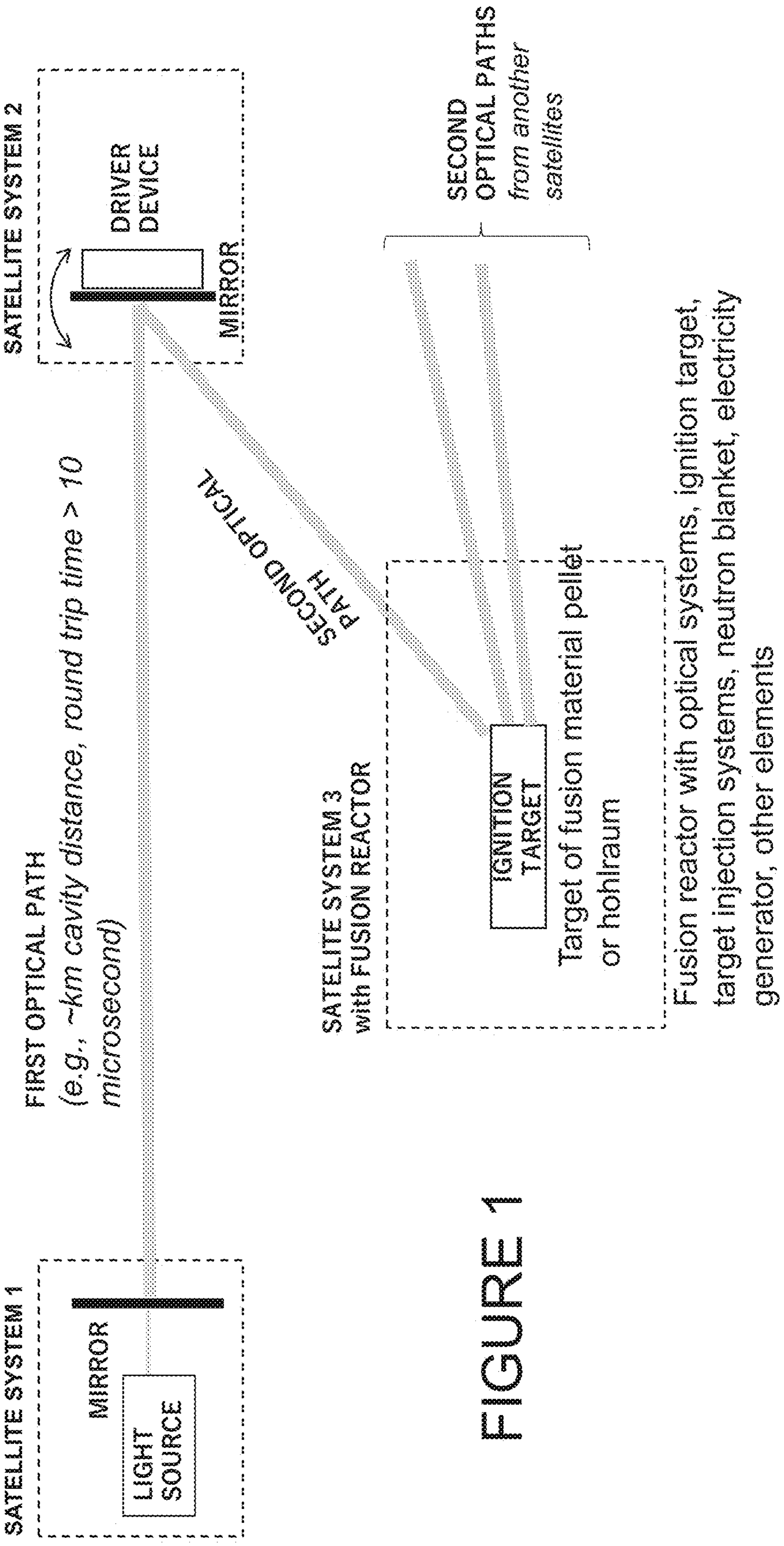
FIG. 1 is a simplified diagram of a laser fusion system configured to a pair of satellite systems according to an example of the present invention.

FIG. 1 is a simplified diagram of a laser fusion system configured to a pair of satellite systems according to an example of the present invention. As shown, the system has a first satellite system 1 and a second satellite system. A first optical path is defined between the first satellite system and the second satellite system. A pair of mirror devices are configured, respectively, on the first satellite system and the second satellite system to form the first optical path.

In an example, the second satellite system is configured with a driver device coupled to an optical path modification device, which changes the propagation of a high intensity pulsed laser beam from the first optical path to a second optical path. The second optical path is directed to a target within a fusion reactor system to interact with the target to initial a fusion reaction. As shown, a plurality of other high intensity pulsed laser beams can be directed to the target concurrently with the high intensity pulsed laser beam from the first optical path between the first satellite system and the second satellite system. Further details of the present system can be found throughout the present specification and more particularly below.

In an example, the present invention provides a reactor system for a space application. The system has a reactor comprising a fusion material, e.g., fuel pellet, hohlraum with fusion material. The system has at least one satellite system positioned in an orbit above a geographical location of a planet. In an example, the satellite system is operably coupled to the reactor including the fusion material, as shown.

In an example, the system has an optical cavity being maintained in a vacuum of 300 Torr and less and characterized by a length of free space of 10 meters to 10 kilometers and positioned with the satellite system. In an example, the optical cavity is configured to increase an intensity of a laser beam comprising a pulse from a certain of energy power intensity to a higher energy power intensity propagating on a first optical path by circulating or reciprocating at least a portion of the laser beam from a light source having a pulse energy output power of 0.001 Milli-Joule to 1 Mega-Joule on the first optical path.

In an example, the system has an optical path modification device coupled to the optical cavity. In an example, the optical path modification device is configured to repeatedly change a spatial direction of the laser beam propagating on the first optical path at a predetermined timing ranging from 0.001 microseconds to 3 seconds with the response time from 1 picosecond to 30 microseconds to cause the laser beam propagating on the first optical path to change a direction to a second optical path that is outside of the first optical path to interact with the fusion material after using a several of mirrors. The optical path modification device is configured to propagate the laser beam on the second optical path generating a high intensity pulse laser to be directed to a target.

In an example, the system has at least a pair of mirror devices. At least one of the mirror devices is configured on the satellite system. In an example, each of the mirror devices has a mirror surface area of 1 $cm^2$ and 100,000 $m^2$, and is configured with the optical path modification device and provided within the first optical path. In an example, at least one the mirror device is configured to change a spatial position of the mirror device being coupled to the propagation of the laser beam.

In an example, the system has a timing device configured with the optical path mechanism and having a predetermined frequency to adjust the spatial position of the mirror device such that the timing device is configured to adjust the spatial position of the mirror device after a predetermined number of cycles of the laser beam between at least the pair of mirrors such that each cycle of the laser beam progressively increases an intensity of a pulse of the laser beam.

In an example, the system has a spatial driver device coupled to the timing device and the at least one mirror device configured to adjust the spatial position of the mirror device to move the spatial position of the mirror device from a first position to a second position after the predetermined number of cycles. Further details of the satellite system are found throughout the present specification and more particularly below.

In an example, each satellite has a laser fusion system, which can be physically connected to each other with structural materials, e.g., beams and pillars to immobilize mutual position of components on different satellites. In an example, physical structures can be used, along with systems for fixing a distance between at least two satellites with or without such physical structures. Other variations, combinations, and modifications to such connection systems can be included.

Figure 2:
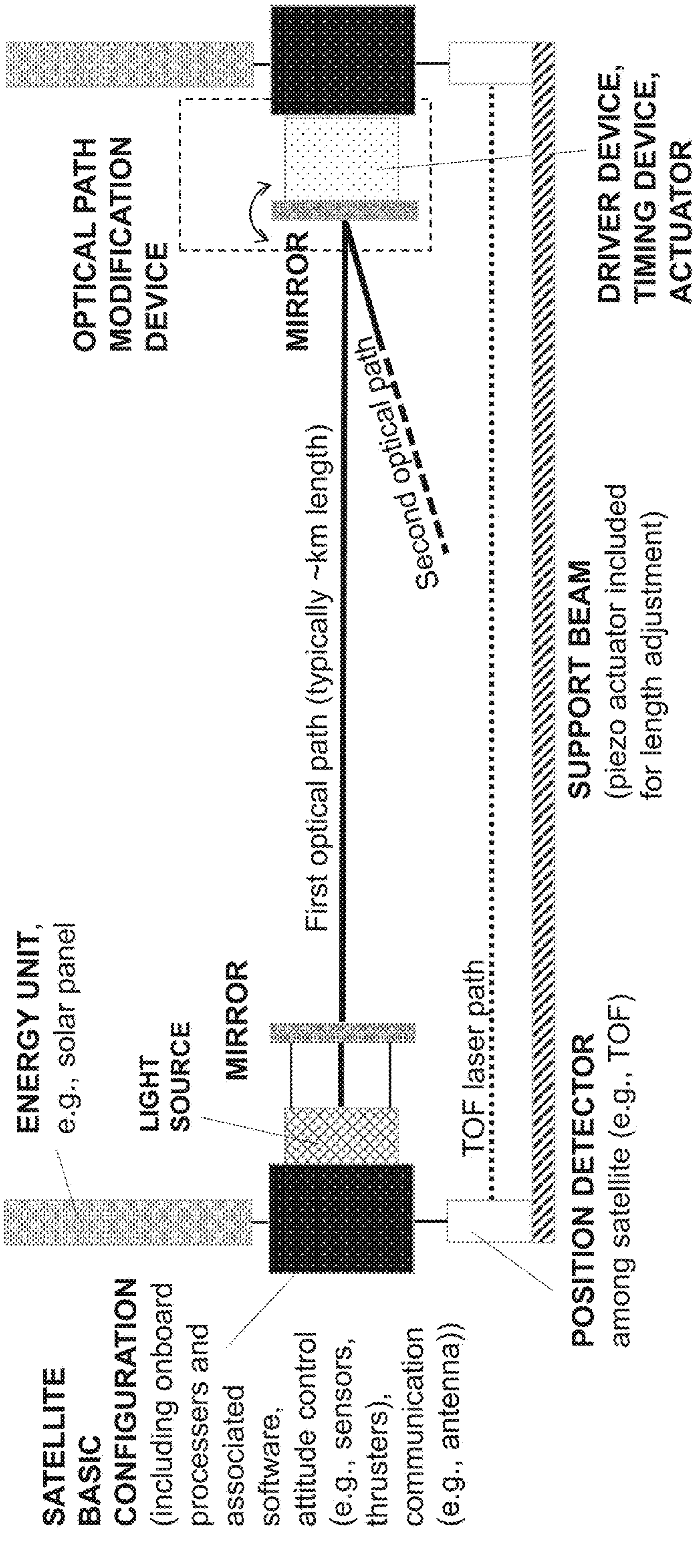
FIG. 2 is a more detailed diagram of a laser fusion system configured to a pair of satellite systems according to an example of the present invention.

FIG. 2 is a more detailed diagram of a laser fusion system configured to a pair of satellite systems according to an example of the present invention. As shown, the system has a first satellite system coupled to a second satellite system. Each satellite system has a solar energy unit, which generates energy for the satellite system. One of the satellite systems includes a laser light source, which is operably coupled to a mirror device. A second mirror device coupled to a second satellite system is configured with an optical path modification device, as shown. The optical path modification device is configured with a driver device, a timing device, and other elements, each of which will be described in more detail below. In an example, the optical path modification device changes propagation of the high intensity pulse laser beam from the first optical path to the second optical path.

In an example, each of the satellite system is configured with a support beam, which couples the satellite systems together, as shown. The support beam can be made of Carbon Fiber Reinforced Plastics (CFRP), aluminum alloy, and other lightweight materials. The support beam is coupled to a position detector including a time of flight sensor. In an example, the time of flight sensor includes a laser device and sensing device to monitor and adjust the position between the satellite systems. The piezo actuator can be configured to adjust mutual position of satellites in an example.

Figure 3:
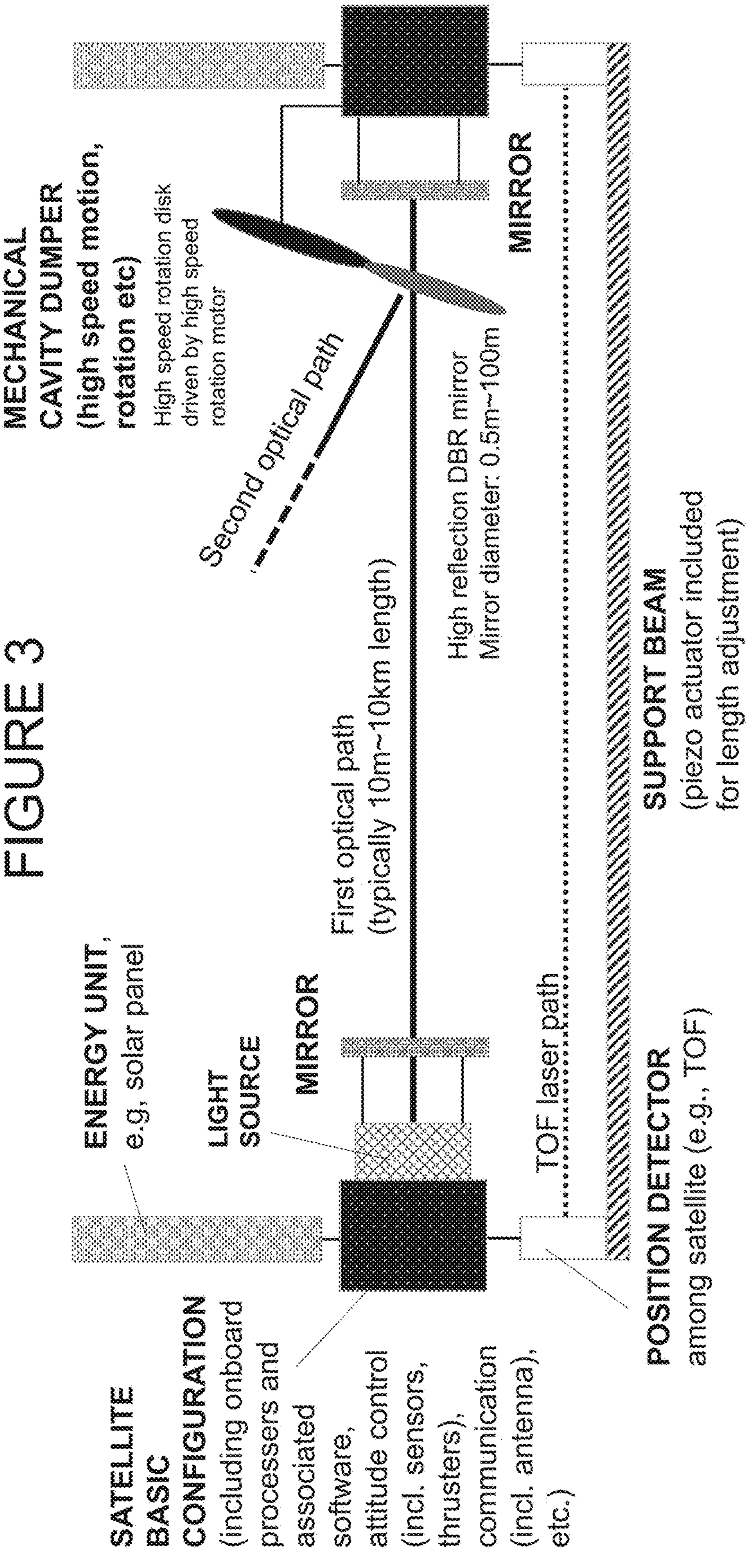
FIG. 3 is a more detailed diagram of a laser fusion system configured to a pair of satellite systems according to an example of the present invention.
Figure 3A:
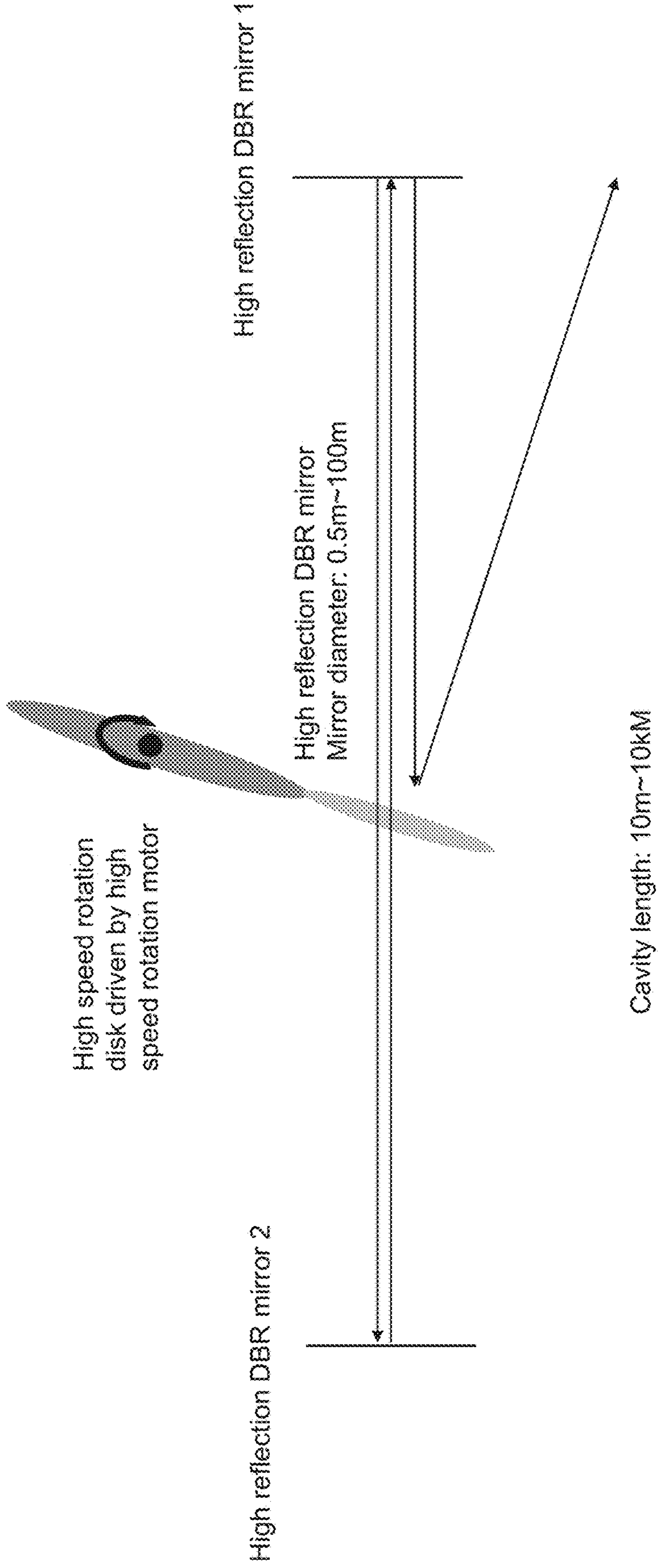
Figure 3B:
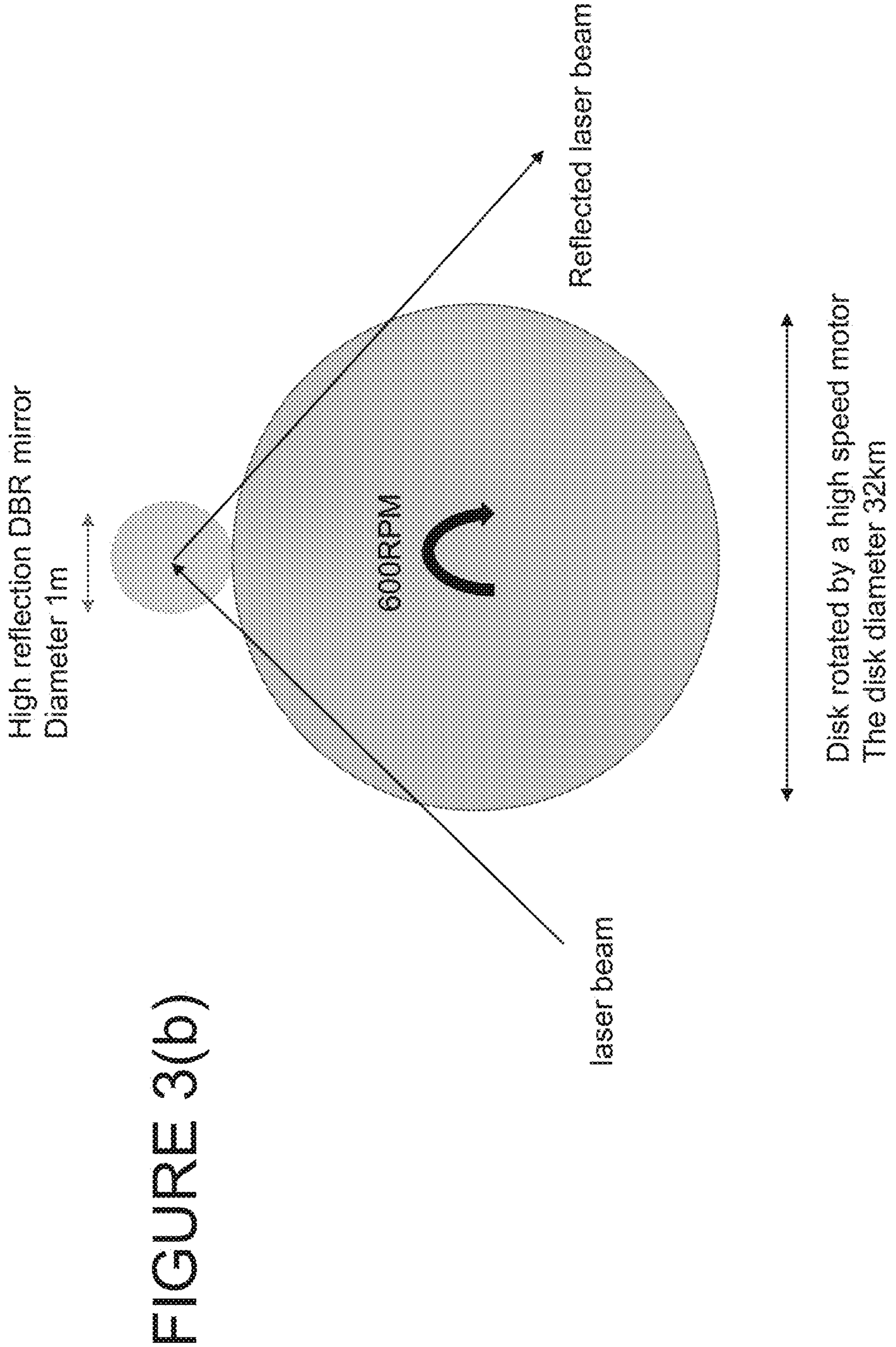
Figure 3C:
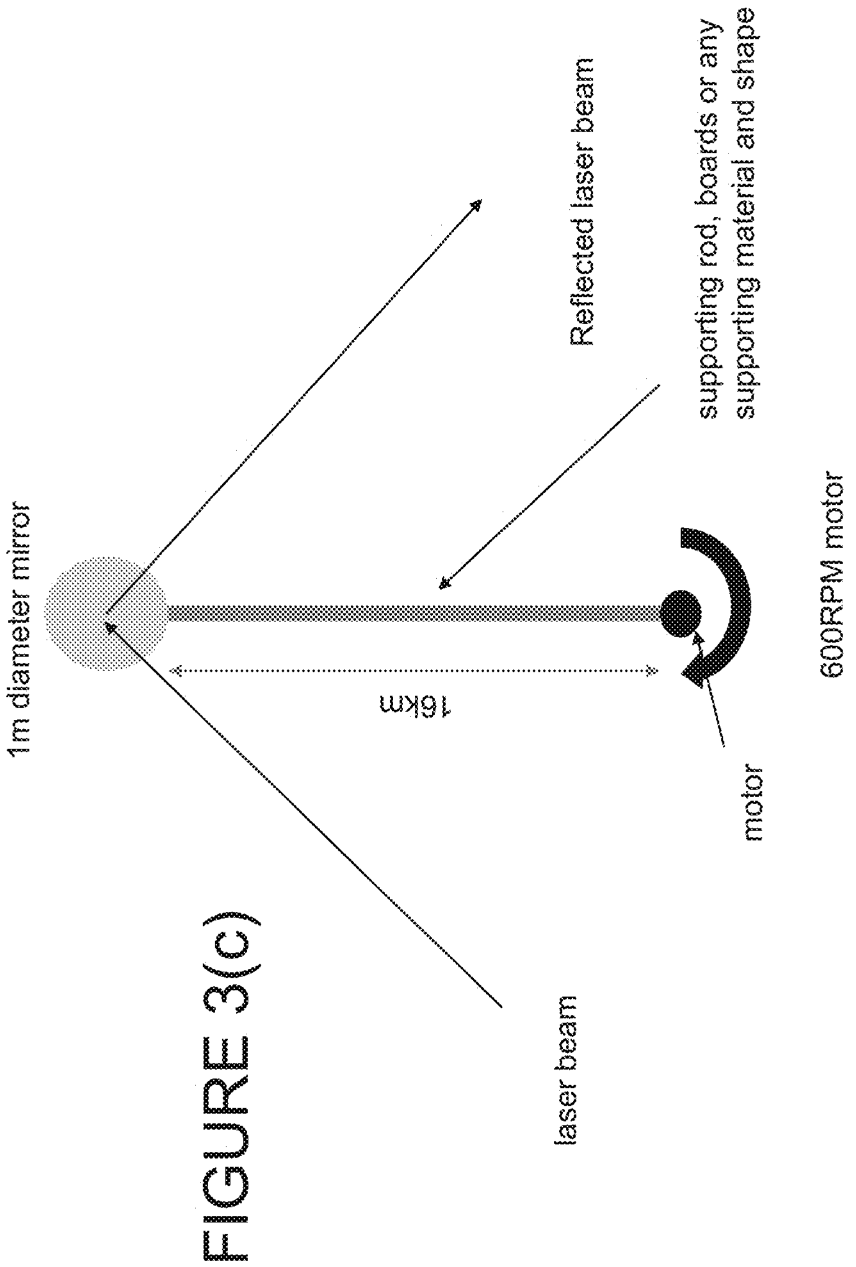

FIG. 3 is a more detailed diagram of a laser fusion system configured to a pair of satellite systems according to an example of the present invention. In an example, the present system includes common elements as the prior Figure. In an example, the present system includes a mechanical cavity dumper device. The cavity dumper is designed to cut off the pulse of laser light propagating on the first optical path at the right time. The cavity dumper device rotates or moves and mechanically changes the high intensity pulse laser beam propagating in the first optical path to the second optical path.

In an example, a mechanical cavity dumper is a device that is used to change the direction and path of an optical beam, such as a laser beam, from a first path to a second path. The cavity dumper is configured with an optical cavity, which is a closed or partially closed space that is designed to reflect light, which is a movable component that can be inserted into the cavity to reflect the beam in an example.

In an example, a mechanically movable cavity dumper can be mounted on separate satellite from the satellites holding mirrors configuring the first optical path or other optical paths, which is described in more detail below.

FIG. 3(*a*) is a more detailed diagram of an optical path modification device of FIG. 3 according to an example of the present invention. As shown, a cavity is configured between a pair of mirror devices, including mirror 1 and mirror 2. A laser light source emits a laser beam from one mirror to the other mirror to cause the laser beam to resonate to form a resonator device. An optical path modification device is configured spatially between the pair of mirrors. The optical path modification device (which forms the cavity dumper device) includes a high-speed rotational motor coupled to a high reflectively mirror that are actuated to move the mirror device into the first optical path to change the direction of the laser beam propagating in the resonator to a second optical path outside the first optical path.

In an example, the cavity includes a reflective material, such as a mirror, and is shaped in a way that allows the beam to be reflected multiple times as it travels through the cavity. To change the direction and path of the beam, the dumper element is moved into the cavity in a specific position, causing the beam to be reflected in a different direction. This allows the beam to be redirected from its original path to a new path, such as the second path.

In an example, the present invention includes a high-intensity short-pulse laser generation system. The system has a resonator and an optical path changing device coupled to the resonator. The resonator is configured to, by causing at least a part of laser light outputted from a light source to circulate or make a round trip along a first optical path having been determined in advance, enhance an intensity of the laser light propagating along the first optical path. The optical path changing device is coupled to the resonator is configured to, by changing a propagation direction of the laser light propagating along the first optical path repeatedly at a predetermined timing, cause the laser light propagating along the first optical path to propagate onto a second optical path that is not on the first optical path, thereby generating high-intensity short-pulse laser light onto the second optical path.

In an example, the resonator includes a first optical system disposed on the first optical path, and the optical path changing device is configured to change the propagation direction of the laser light by at least driving the first optical system in accordance with the predetermined timing.

In an example, the first optical system includes at least one pair of reflection mirrors that defines the first optical path of Fabry-Perot resonant cavity by reflecting the laser light outputted from the light source on the first optical path, and the optical path changing device is configured to, by driving a drive reflection mirror that is at least one of the at least one reflection mirror, insert the drive reflection mirror into the inside of the cavity in accordance with the timing, thereby reflecting the high-power laser light to change the propagation direction of the high-power laser light.

A spatial driver device coupled to the timing device and the optical path modification device being configured such that a drive reflection mirror is inserted into the inside of the cavity to reflect the high-power laser beam to change a direction of propagation of the laser beam repeatedly, thereby causing the laser beam propagating on the first optical path changing the laser beam to the second optical path.

In an example, the optical path changing device insert the drive reflection mirror into the inside of the cavity to change the propagation direction of the high-power laser light with the repetition rate from 0.001 microseconds to 3 seconds with the response time from 1 picosecond to 30 microseconds.

In an example, as shown, the optical path changing device includes a rotating portion configured to be able to rotate at a predetermined speed along a predetermined rotation axis, and a coupling portion that couples the rotating portion and the drive reflection mirror. In an example, the coupling portion is configured to determine a speed of the drive reflection mirror by controlling a distance from the center of the rotation to the mirror, there by inserting the drive reflection mirror into the inside of the cavity with the response time from 1 picosecond to 30 microseconds to change the propagation direction of the high-power laser light, thereby causing the laser beam propagating on the first optical path changing the laser beam to the second optical path. The repetition rate from 0.001 microseconds to 3 seconds is determined by the rotation speed of motor such as RPM.

FIG. 3(*b*) is a more detailed diagram of an optical path modification device of FIG. 3 according to an example of the present invention. In an example, the device has a cavity dumper device for, for example, space allocation using a high-speed rotation motor. The high-speed rotation motor including a disk, which rotates at a high-speed of 600 RPM. 600 RPM motor is used, which value determines the repetition rate of 10 Hz of high-power laser because each one cycle of motor, the drive reflection mirror is inserted into the inside of cavity to reflect the high-power lasers, thereby causing the laser beam propagating on the first optical path changing the laser beam to the second optical path. As shown, the system has a laser light source that is reflected by a mirror device that is configured on the disk of the rotation motor. The laser light source is on a first path, which is in a cavity to form a resonator, e.g., Fabry Perot cavity.

FIG. 3(*c*) is a more detailed diagram of an optical path modification device of FIG. 3 according to an example of the present invention. In an example, the device has a cavity dumper device for, for example, a space application using a high-speed rotation motor or like configuration. The high-speed rotation motor includes a supporting rod or member, a board or any supporting material and shaped for support of a drive reflection mirror. The support has a length of 16 kilometers, which rotates at a high-speed of 600 RPM, as an example, although there may be other lengths and rotational speeds. A 600 RPM motor determines a repetition rate of 10 Hz for the high-power laser. That is, upon each cycle (e.g., one cycle) of the motor, a drive reflection mirror is inserted into the inside of cavity to reflect the high-power laser beam, thereby causing the laser beam propagating on the first optical path to change the direction of the laser beam to the second optical path or other optical path. The supporting rod, board or any supporting materials for support of a drive reflection mirror with a length of 16 kilometers rotates with the dimeter of 32 kilometers by the 600 RPM motor, thereby creating response time of 1 micro second in an example. Again, the aforementioned parameters are merely examples.

In an example, when the Fabry Perot cavity length is 150 m, the round trip time of the laser beam is 1 microsecond. After 100,000 times round trip, the intensity of the input laser light source is increased up to 100,000 times with the repetition rate of 0.1 seconds. Then, the high-power pulse laser is extracted by the high reflection mirror every 0.1 second with the frequency of 10 Hz with rotation speed of motor of 600 RPM. In an example, a 1 meter size mirror has to pass the cavity within 1 micro second because next laser pulse will occur every 1 microsecond. In order to satisfy the aforementioned conditions, the disk diameter is 32 kilometers to increase the speed of a drive reflection mirror using a 600 RPM rotation motor and, then 1 m size mirror is attached to disk circumference, in this example.

In an example, the disk diameter ranges from 10 kilometers to 500 kilometers. In an example, the size of a high reflection mirror ranges 0.5 meter to 10 meters. In an example, the rotation speed of the disk ranges from 300 RPM to 10,000 RPM. In an example, the cavity has a length ranging from 10 meters to 10 kilometers. Other ranges can also be used depending on the application.

Figure 4:
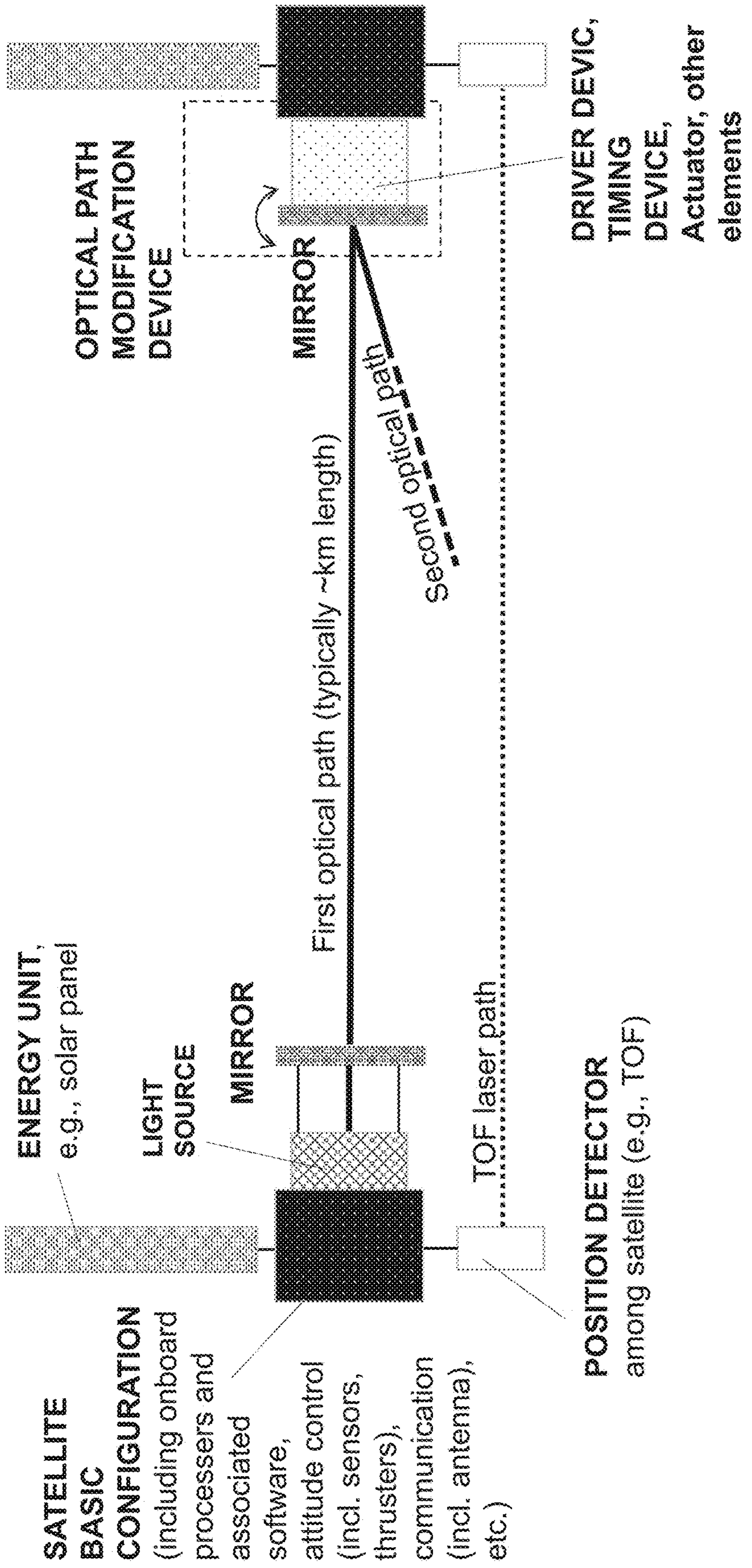
FIG. 4 is a more detailed diagram of a laser fusion system configured to a pair of satellite systems according to an example of the present invention.

FIG. 4 is a more detailed diagram of a laser fusion system configured to a pair of satellite systems according to an example of the present invention. As shown, the system includes common elements as the prior systems. The system, however, uses a position detector system between the two satellite systems to maintain a desired spacing or gap between the two systems. The detector system includes a laser device and a sensing device to detect the laser device, and can preferably use TOF, or other distance and position sensors, e.g., a light detection and ranging ("LIDAR") system. Further details of the elements of the present system can be found throughout the present specification and more particularly below.

Figure 5A:
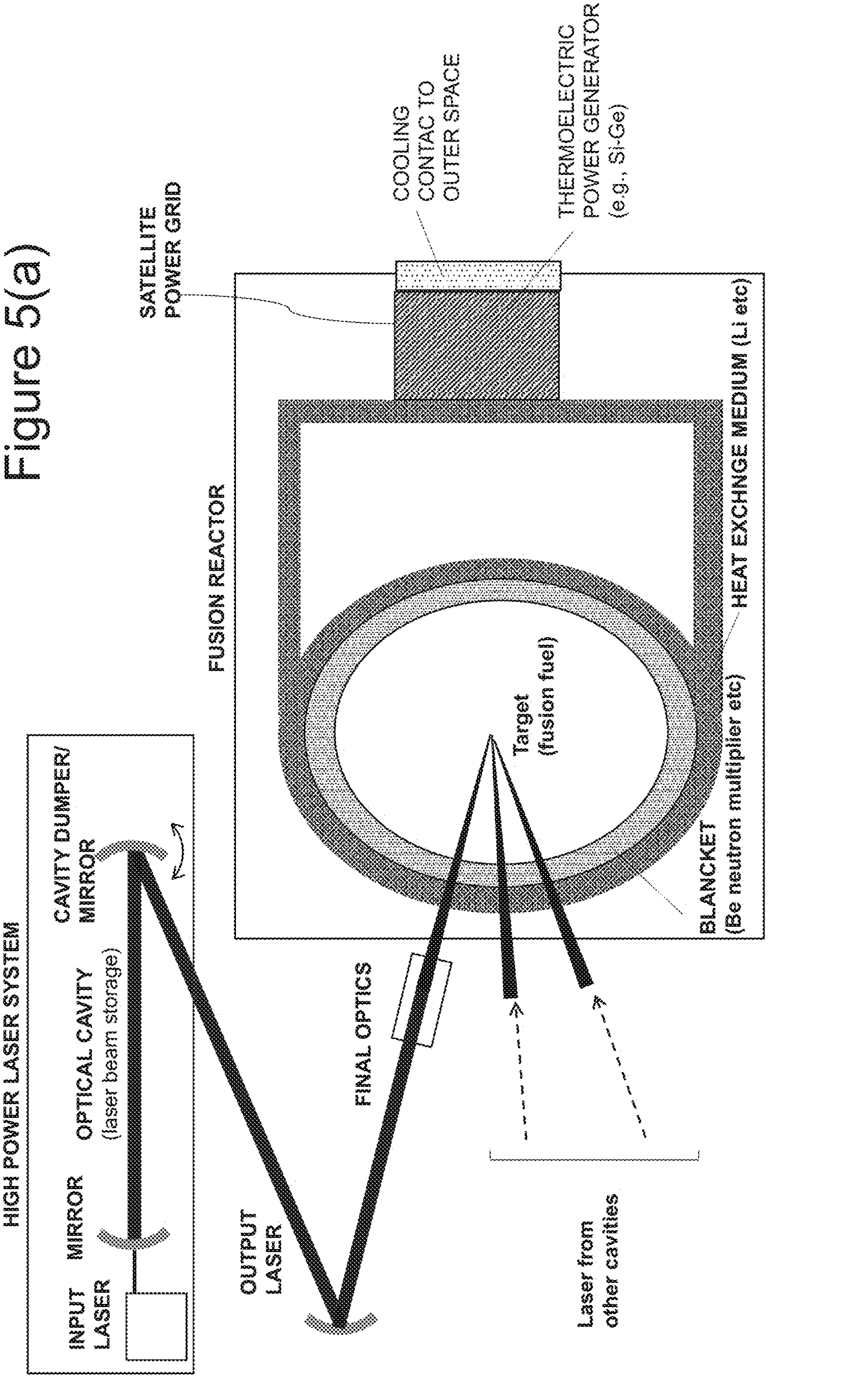
FIGS. 5(*a*) and 5(*b*) are simplified diagrams of a laser fusion system according to an example of the present invention.
Figure 5:
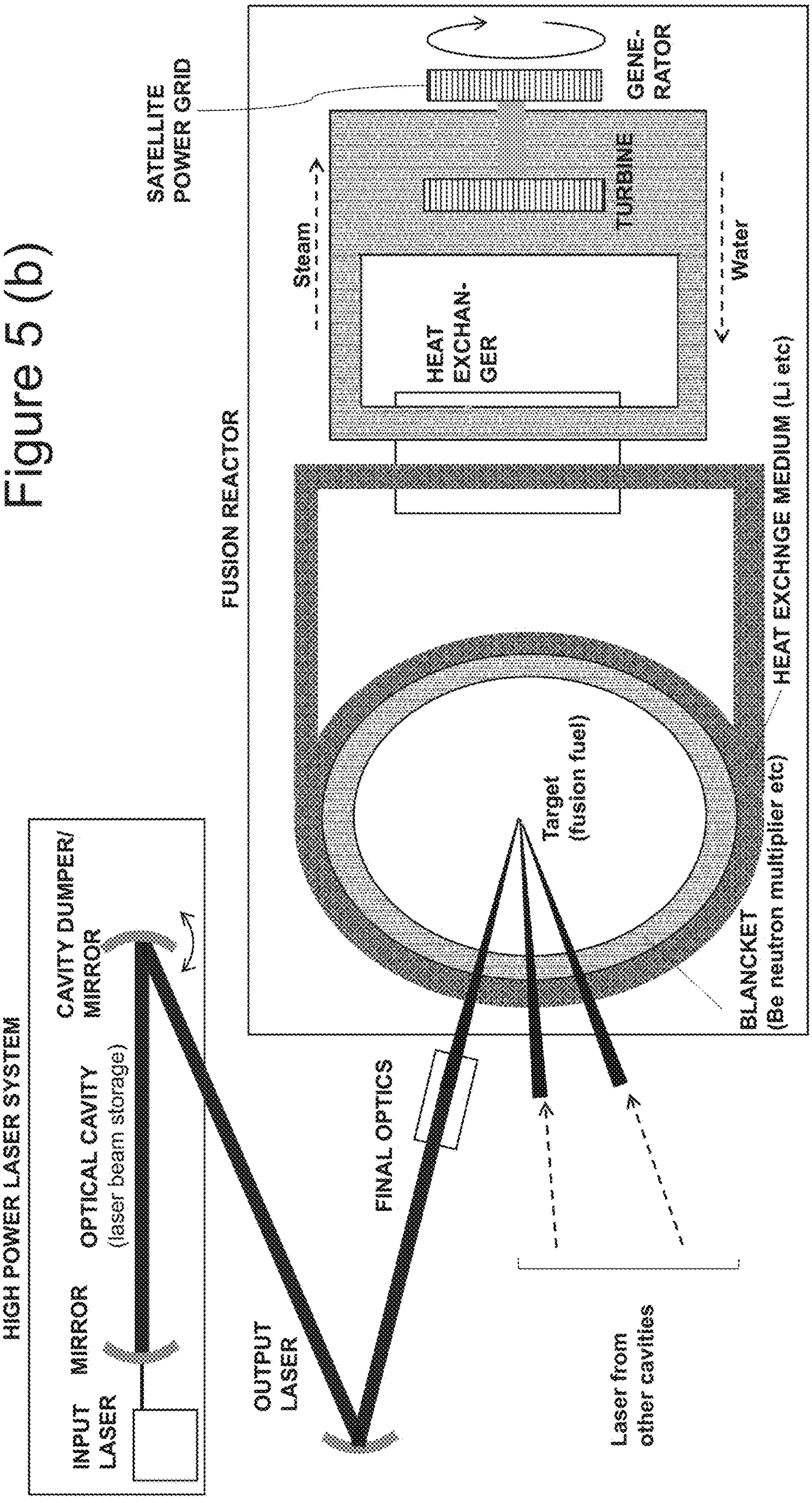

FIG. 5(*a*) is a simplified diagram of a laser fusion system according to an example of the present invention. As shown, the system has a high-power pulse laser system, which is configured with a fusion reactor. The fusion reactor includes a target within a blanket structure, which could absorb the fusion energy including the momentum energy of neutron, helium and tritium to generate a thermal energy, and some of neutrons are used to multiply tritium for reuse as a fuel. Then, the thermal energy is transferred to the surrounding heat exchange medium. The blanket is surrounded by a heat exchange medium which is configured to transfer thermal energy from the blanket to the medium. The medium is coupled to a thermoelectric device to generate electricity directly from temperature difference. The thermoelectric device is connected to outer space to keep the outside of thermoelectric device at low temperature. In an example, the thermoelectric device includes, but are not limited to materials based on SiGe, BiTe, among others.

In an example of FIG. 5(*b*), alternatively, the medium is coupled through a heat exchanger. The heat exchanger transfers the thermal energy from the medium to water to generate the high pressure steam, which rotates a turbine. The rotation of the turbine in a magnetetic field generate the electricity, and then it works as an electric generator for use on a power grid for a private or public power system.

In an example, the present system couples a high-power pulse laser system to a fusion reactor to create a high-power energy source to initiate and perpetuate a fusion reaction. As an example, laser fusion is a process in which energy is generated through the fusion of atomic nuclei. The process occurs when the nuclei of two or more atoms are brought together and collide at high temperatures and high pressures, causing them to fuse together and release a large amount of energy. In the laser fusion process in an example, a high-energy laser beam is used to compress and heat a small pellet of fuel, typically a mixture of deuterium and tritium (two isotopes of hydrogen). The laser beam creates a shockwave that compresses the fuel, causing it to reach temperatures and pressures high enough for fusion to occur. During the fusion process, the atomic nuclei of the fuel atoms combine to form a heavier nucleus, releasing a large amount of energy. This energy can then be harnessed and used to generate electricity, as noted previously. Further details of the present fusion system, and in particularly a high-power laser are provided throughout the present specification and more particularly below.

As an example, a high-power laser is a device that produces a highly concentrated and focused beam of light with a high level of power. The light produced by a high-power laser can have a variety of properties, such as wavelength, intensity, and coherence, which depend on the specific design and construction of the laser.

One type of high-power laser is the solid-state laser, which is made of a solid gain medium that is pumped by an external energy source, such as a flashlamp or another laser. The gain medium is typically a crystal or glass rod that is doped with a rare earth element, such as neodymium or ytterbium, to amplify the laser beam. Solid-state lasers are highly efficient and can produce high power outputs, making them ideal for many industrial and scientific applications.

Another type of high-power laser is the gas laser, which uses a gas as the gain medium. Gas lasers can be further classified based on the type of gas used, such as helium-neon lasers, carbon dioxide lasers, and argon lasers. Gas lasers are highly reliable and have a long lifespan, making them suitable for continuous operation.

A high-power laser can also be a hybrid of the two aforementioned types, such as a fiber laser, which uses a doped fiber as the gain medium. Fiber lasers are highly efficient and can produce very high power outputs, making them ideal for many industrial and scientific applications.

There are many factors that contribute to the performance and efficiency of a high power laser, such as the gain medium, pump source, resonator design, and cooling system. The design and construction of a high-power laser can greatly impact its performance and suitability for a specific application. As an example, a high power laser is a highly concentrated and focused beam of light with a high level of power, used in a wide range of applications.

In an example, the present invention provides a high intensity pulse laser generation system. In an example, a high intensity pulse laser is a type of laser that produces a highly concentrated and focused beam of light with a high level of power, but with a pulse duration that is much shorter than the average pulse duration of a continuous wave laser. The short pulse duration of a high intensity pulse laser allows for high peak power and the ability to deliver energy to a target in a very short period of time.

In an example, one type of high intensity pulse laser is the Q-switched laser, which uses a mechanical or electro-optical modulator to rapidly switch the laser beam on and off. This allows the laser to produce very short pulses, with pulse durations ranging from nanoseconds to picoseconds. Q-switched lasers are highly efficient and can produce very high peak powers, making them ideal for many industrial and scientific applications. Another type of high intensity pulse laser is the mode-locked laser, which uses a nonlinear optical element, such as a saturable absorber or a passive mode locker, to generate short pulses. Mode-locked lasers can produce very short pulses, with pulse durations ranging from femtoseconds to picoseconds. They are highly stable and can produce very high peak powers, making them ideal for many scientific and research applications.

There are many factors that contribute to the performance and efficiency of a high intensity pulse laser, such as the gain medium, pump source, resonator design, and pulse generation method. The design and construction of a high intensity pulse laser can greatly impact its performance and suitability for a specific application. In an example, a high intensity pulse laser is a type of laser that produces a highly concentrated and focused beam of light with a high level of power and a very short pulse duration. It is used in a wide range of applications. In an example, the present invention provides a high intensity pulse laser generation system and related methods as described throughout the present specification and more specifically below.

Figure 6:
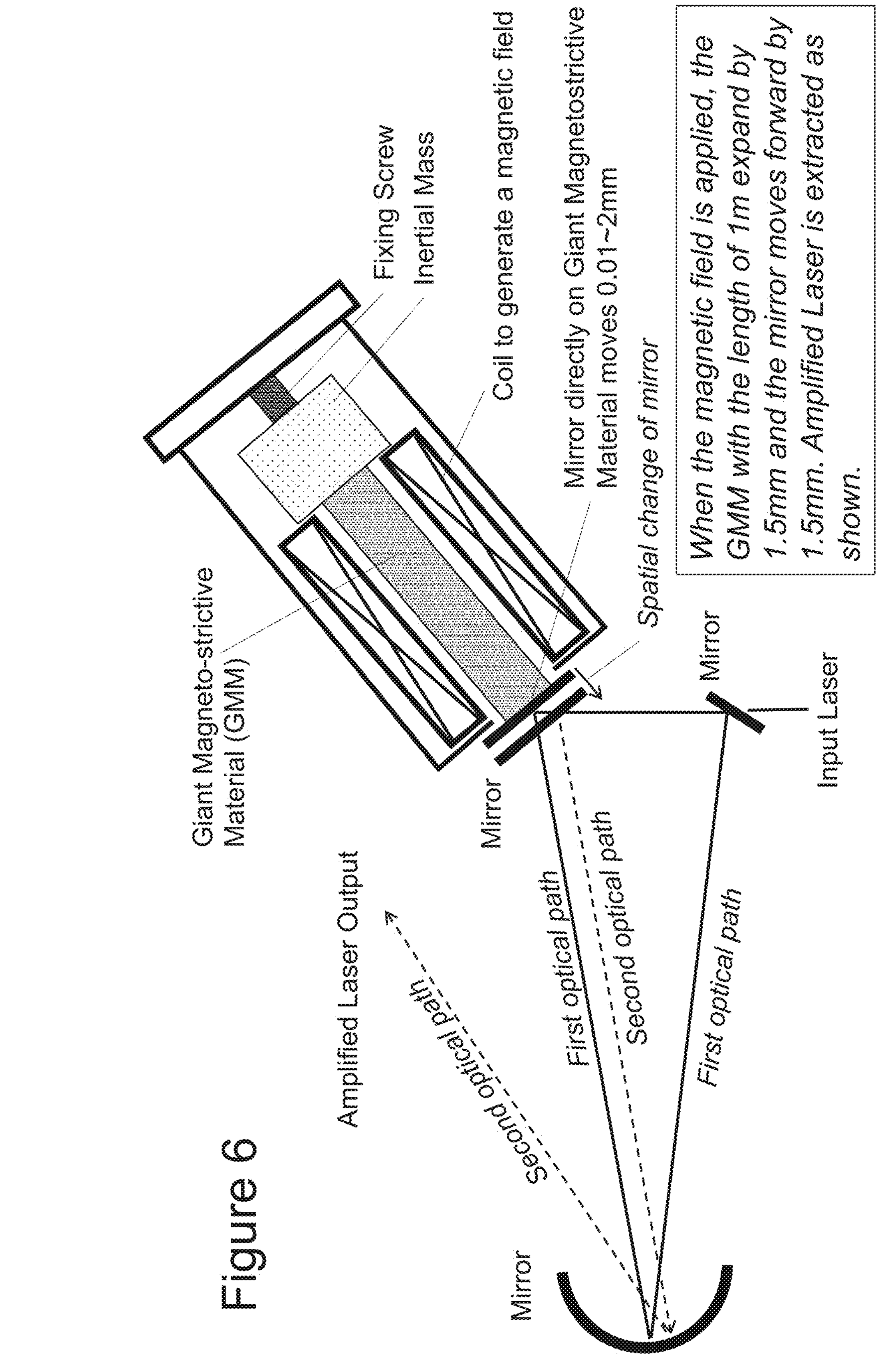
FIG. 6 is a simplified diagram of a high intensity pulse laser generation system according to an example of the present.

FIG. 6 is a simplified diagram of a high intensity pulse laser generation system according to an example of the present. As shown, the system has an input laser that is configured with a first optical path, which begins with the laser input, reflects off a mirror, coupled to an actuator, and reflects off a curved mirror back to a vicinity of the input laser to reflect off a flat mirror to form a triangular path between two flat mirrors and a curved mirror. Further details of the first optical path are provided throughout the present specification and more particularly below.

In an example, an intensity of the input laser is added to increase an intensity level of the laser beam propagating in the triangular path from a first intensity level, a second intensity level, and so on to an Nth intensity level. The intensity is increased until a desired intensity level is achieved. Once the desired intensity level has been achieved, the actuator moves the flat mirror from a first position to a second position spatially to change the beam path from the first optical path to the second optical path. In an example, the second optical path changes a spatial location of a reflection point on the mirror coupled to the actuator to direct the beam from the mirror to a reflection point on the curved mirror to an outward path for a high intensity pulse laser beam. In an example, the high intensity pulse laser beam is multiple times an intensity of the input laser beam.

As shown, the system uses both high reflection flat and curved optical mirror devices with a reflectivity of more than 99.99% or 99.999% to minimize an optical loss. In an example, a high reflection optical mirror is a device that reflects light in a specific direction. The device has a flat or curved surface, coated with a high reflective material, such as dielectric materials, or, metal materials, e.g., aluminum, silver, or gold. The preferred high reflection optical mirror is a dielectric distributed Brag Reflector (DBR). In an example, the shape and curvature of the mirror determine the direction and intensity of the reflected light.

As shown, there are several types of high reflection optical mirrors, each with specific properties and uses. Flat mirrors, also known as plane mirrors, have a flat reflecting surface and are used to reflect light in a straight line. In an example, concave mirrors have a curved inward reflecting surface and are used to focus light to a single point. In an example, convex mirrors have a curved outward reflecting surface and are used to spread out light over a wider area. In an example, optical mirrors can also be coated with specialized coatings, such as dielectric coatings or metallic coatings, to enhance their reflective properties and reduce surface defects, which causes optical absorption resulting in optical damages. These coatings can improve the efficiency and performance of the mirror, making it suitable for a specific application.

As shown, the actuator is magneto-strictive actuator in an example. In an example, a magneto-strictive actuator is a device that uses the magnetostriction effect to produce a controlled movement or displacement. The actuator has a magneto-strictive material, such as iron, cobalt, or nickel, and a magnetic field source, such as a permanent magnet or an electromagnet. A preferred example of a magneto-strictive material is shown in FIG. 6A and others.

When the magneto-strictive material is subjected to a magnetic field, it experiences a change in shape or dimensions, which results in a mechanical displacement. By controlling the strength and orientation of the magnetic field, the displacement of the magneto-strictive actuator can be precisely controlled. In a preferred example, magneto-strictive actuators have a number of properties that make them well-suited for fast actuation applications. They have a high response speed, low power consumption, and a high force-to-weight ratio, which allows them to produce large displacements with minimal input power. The response time of nanoseconds is much faster than that of milliseconds of piezo materials. In addition, magneto-strictive actuators have a high fatigue resistance and can operate over a wide temperature range, making them suitable for use in a variety of environments. Magneto-strictive actuators are highly reliable and can operate continuously without the need for maintenance, making them an attractive choice for many fast actuation applications.

In an example, various factors can impact the performance and efficiency of a magneto-strictive actuator, such as the type and composition of the magneto-strictive material, the design and strength of the magnetic field source, and the mechanical design of the actuator. The specific design and construction of a magneto-strictive actuator can impact its performance and suitability for a specific application.

In an example, the actuator is coupled to an electric coil to generate a magnetic field to spatially change the magneto-strictive material. In an example, an electric coil, also known as an inductor or a solenoid, is a device that generates a magnetic field when an electric current is passed through it. The coil is generally a length of wire, typically made of copper or aluminum, wound into a cylindrical or rectangular shape. The number of turns and the diameter of the wire determine the strength of the magnetic field produced by the coil. Various factors can impact the performance and efficiency of an electric coil, such as the type and size of the wire, the number of turns, and the shape of the coil. The specific design and construction of an electric coil can greatly impact its performance and suitability for a specific application.

In an example, the actuator also has a housing, inertial mass, and fixed screw for spatial adjustments. The actuator also has a magneto-strictive material that moves 0.01 to 2 mm, in an example, but can be other lengths. The material has a flat surface that is coupled directly to a backside of the mirror surface. In a preferred example, the flat surface is roughly equal in area as the backside surface of the mirror surface. The material can be affixed using a glue, or mechanically attached on the backside surface in other examples.

Figure 7:
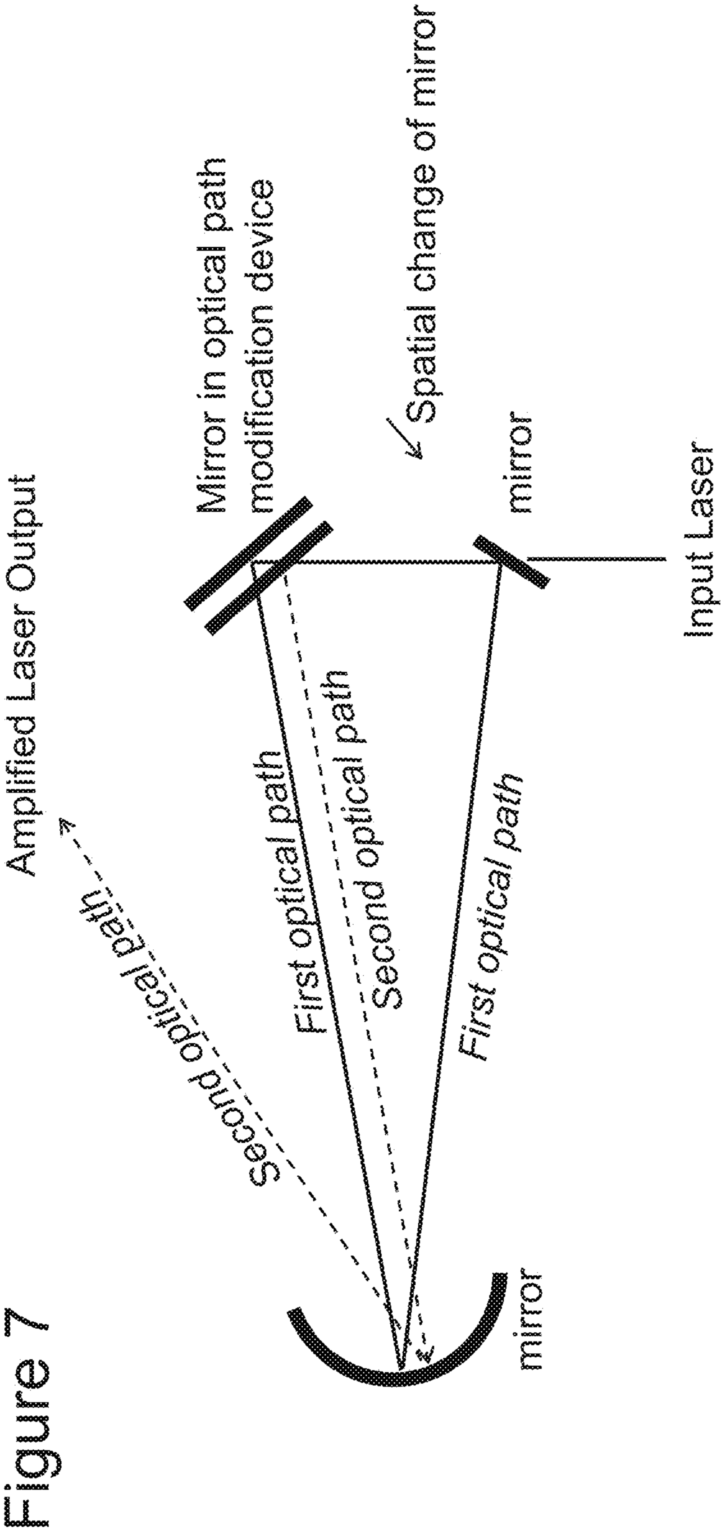
FIG. 7 is a detailed diagram of a multi path configuration for a high intensity pulse laser generation system according to an example of the present invention.

FIG. 7 is a detailed diagram of a multi path configuration for a high intensity pulse laser generation system according to an example of the present invention. As shown, the system has an input laser that is configured with a first optical path, which begins with the laser input, reflects off a mirror, coupled to an actuator, and reflects off a curved mirror back to a vicinity of the input laser to reflect off a flat mirror to form a triangular path between two flat mirrors and a curved mirror. Further details of the first optical path are provided throughout the present specification and more particularly below.

In an example, an intensity of the input laser is added to increase an intensity level of the laser beam propagating in the triangular path from a first intensity level, a second intensity level, and so on to an Nth intensity level. The intensity is increased until a desired intensity level is achieved. Once the desired intensity level has been achieved, the actuator moves the flat mirror from a first position to a second position spatially to change the beam path from the first optical path to the second optical path. In an example, the second optical path changes a spatial location of a reflection point on the mirror coupled to the actuator to direct the beam from the mirror to a reflection point on the curved mirror to an outward path for a high intensity pulse laser beam. In an example, the high intensity pulse laser beam is multiple times an intensity of the input laser beam. As shown and will be described, the various elements that make up a system for changing the beam direction from a first beam path to the second beam path are referred to as a cavity dumper. The term cavity dumper will be interpreted according to the specification, as well as meanings understood by one of ordinary skill in the art. Further details of a cavity dumper device are described in more detail below.

Figure 8:
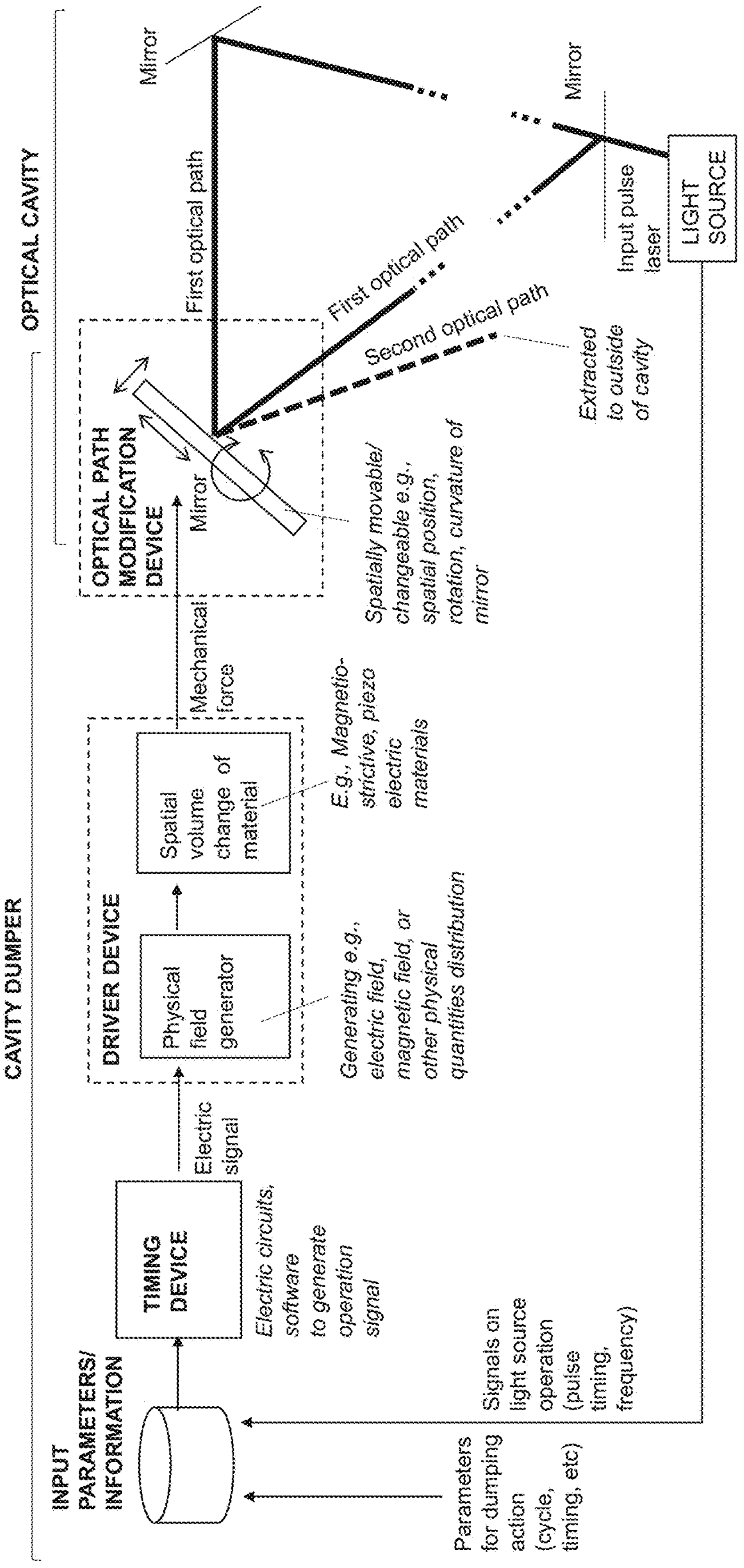
FIG. 8 is a detailed diagram of a cavity dumper for a high intensity pulse laser generation system according to an example of the present invention.

FIG. 8 is a detailed diagram of a cavity dumper for a high intensity pulse laser generation system according to an example of the present invention. As shown, the cavity dumper includes various elements including input parameters and information, a timing device, a driver device (e.g., spatial driver device), and an optical path modification device, although there may be variations. The optical path modification device is coupled to a movable mirror, a curved mirror, and a flat mirror, as shown. The spatial region configured between the mirrors creates an optical cavity, as shown. The optical cavity includes the first optical path, which generates a high intensity laser beam, and a second optical path, which outputs a high intensity pulse laser beam. The second optical path is outside of the optical cavity, as shown. In an example, the second optical path can be directed to a target. The target can be another mirror device, a particle for a reactor, a material to be processed, a moving target, e.g., vehicle, warship, drone, rocket, nuclear warhead, or any other object, whether artificial or natural or a combination thereof.

As shown, information and/or feedback from the light source are fed into a processing platform. The processing platform can be a suitable computer-based processor, controller, or other type of processor. Examples of feedback can include signals from the light source and the photodiodes to detect the transmitted light from the backside of each mirror which are not shown in FIG. 8, including pulse timing, frequency, power output, and other parameters. Parameters for cycling the mirror device are also fed into the processing platform. The processing platform further includes storage, such as volatile and non-volatile memory, including dynamic random-access memory, flash memory, static random-access memory, fixed memory devices, hard drives, and any combination of electronic and/or optical memory devices.

The information from the processing platform is fed into a timing device. The timing device is configured with a clock signal, which is configured with the information, to generate an electronic signal or signals for the driver device. The driver device includes a physical field generator that generates, for example, a magnetic field or an electric field to cause a spatial change of a spatial region in a material such as a magneto-strictive, piezo electric, or other material to output mechanical force to move a spatial position of a movable mirror. The movement of the spatial position of the mirror causes the laser beam to change from the first optical path to the second optical path, or any other optical path. In an example, the driver device can be called a spatial driver device since it drives a mechanical member in free space.

Figure 9:
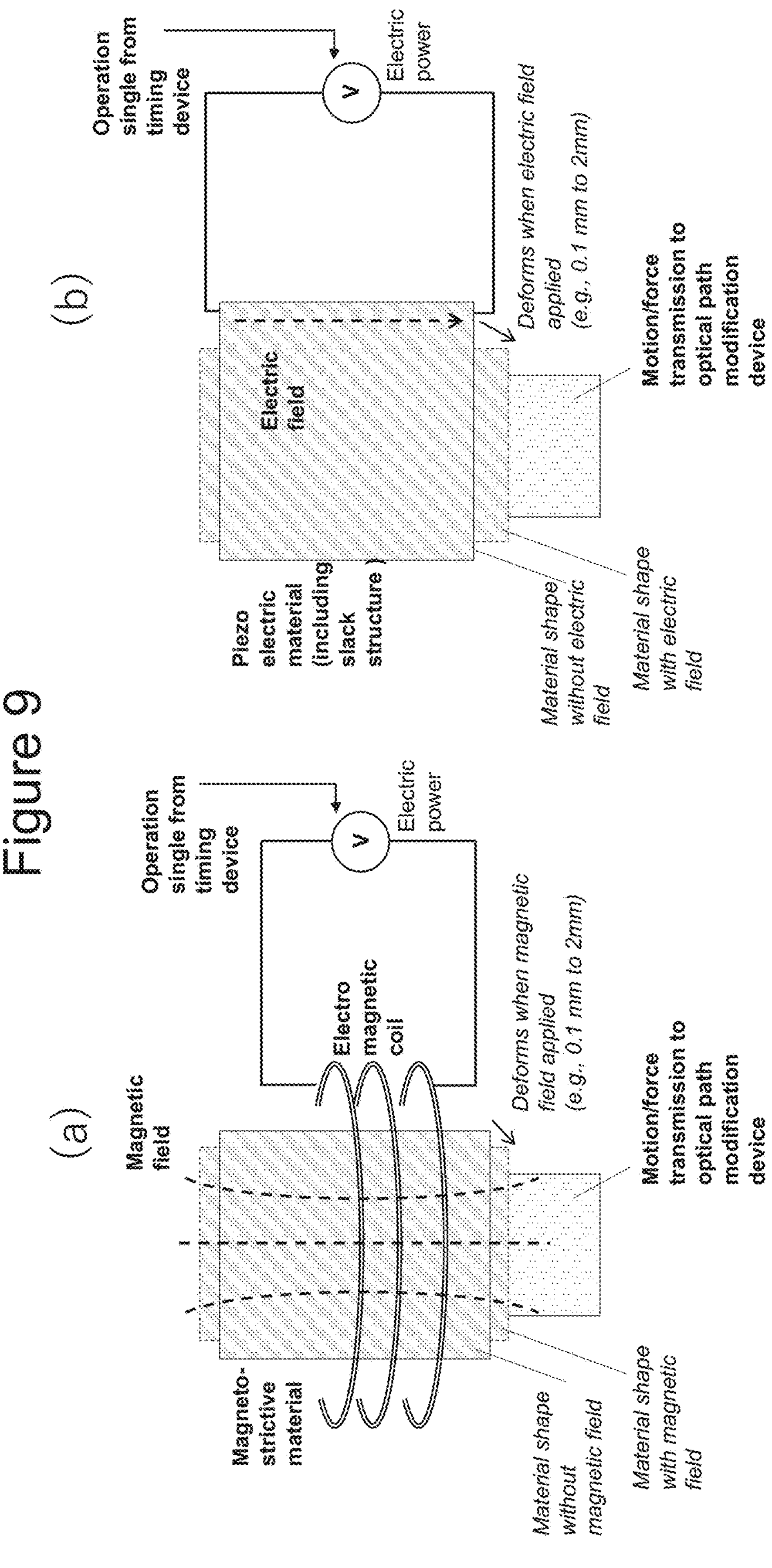
FIG. 9 is a detailed diagram of a driver device for a cavity dumper in an example of the present invention.

FIG. 9 is a detailed diagram of a driver device for a cavity dumper in an example of the present invention. As shown under FIG. 9(*a*) is a magneto-strictive material configured with an electric power source. The electric power source is coupled to a timing device. The power is fed through coils to generate a magnetic field. The magnetic field changes a shape of the magneto-strictive material form a first state to a second state, which elongates the material (or contracts the materials depending on the configuration of system), and causes mechanical force to move an exterior region coupled to a mirror device from a first spatial region to a second spatial region. As shown under FIG. 9(*b*) is a piezo electric material configured with an electric power source. The electric power source is coupled to a timing device. The electric power is fed to the material to generate an electric field. The electric field changes a shape of the piezo electric material form a first state to a second state, which elongates the material, and causes mechanical force to move an exterior region coupled to a mirror device from a first spatial region to a second spatial region.

Figure 10:
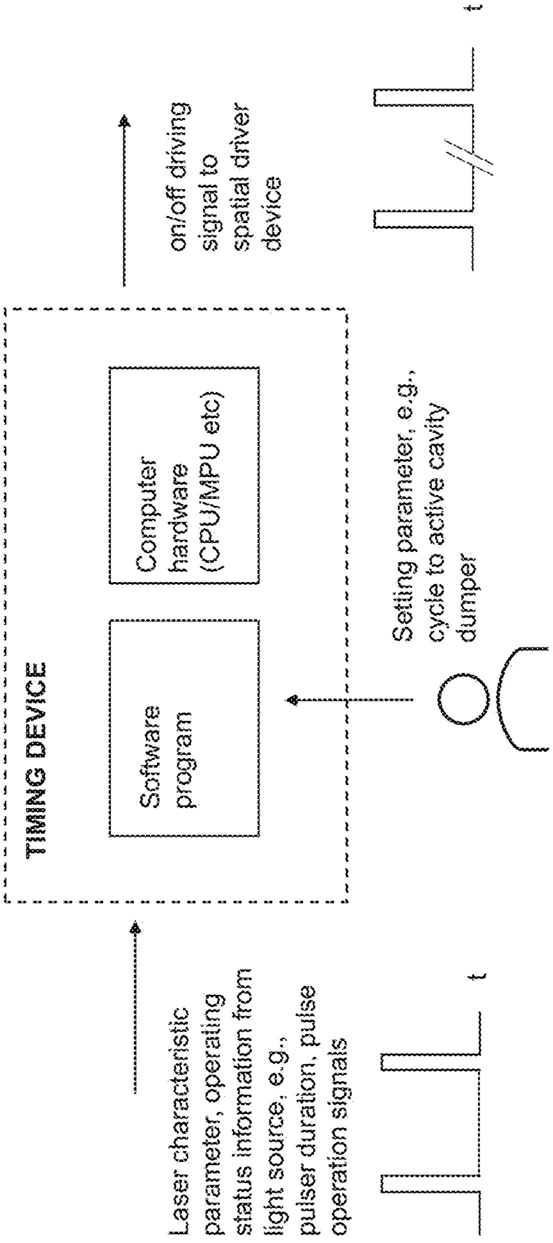
FIG. 10 is a detailed diagram of a timing device for a cavity dumper in an example of the present invention.

FIG. 10 is a detailed diagram of a timing device for a cavity dumper in an example of the present invention. As shown, the timing device receives inputs of, for example, laser characteristics, such as operating status, pulse duration, pulse operation, frequency, and other information. The timing device includes a software program, which is programmable, and computer hardware, among other elements. The timing devices outputs an on/off signal from the driver device to the magneto-strictive material or other material in an example.

In an example, a computer for controlling a drive, which is a high-speed driver, also known as a "drive computer," is a specialized device that is used to control and monitor the operation of a high-speed driver, such as the actuator. In an example, the drive computer typically includes a microprocessor or microcontroller, which is a type of central processing unit (CPU) that is responsible for controlling the operation of the drive. The drive computer also includes input/output (I/O) interfaces, which allow it to receive input signals from sensors or other devices and to output control signals to the drive. In an example, the drive computer may also include memory for storing data and instructions, as well as various other hardware and software components that enable it to perform its functions. Some drive computers may also include additional features, such as communication interfaces for communicating with other devices or systems, or built-in diagnostic tools for monitoring and troubleshooting the drive. Further details of the present system and method are described below.

Figure 11:
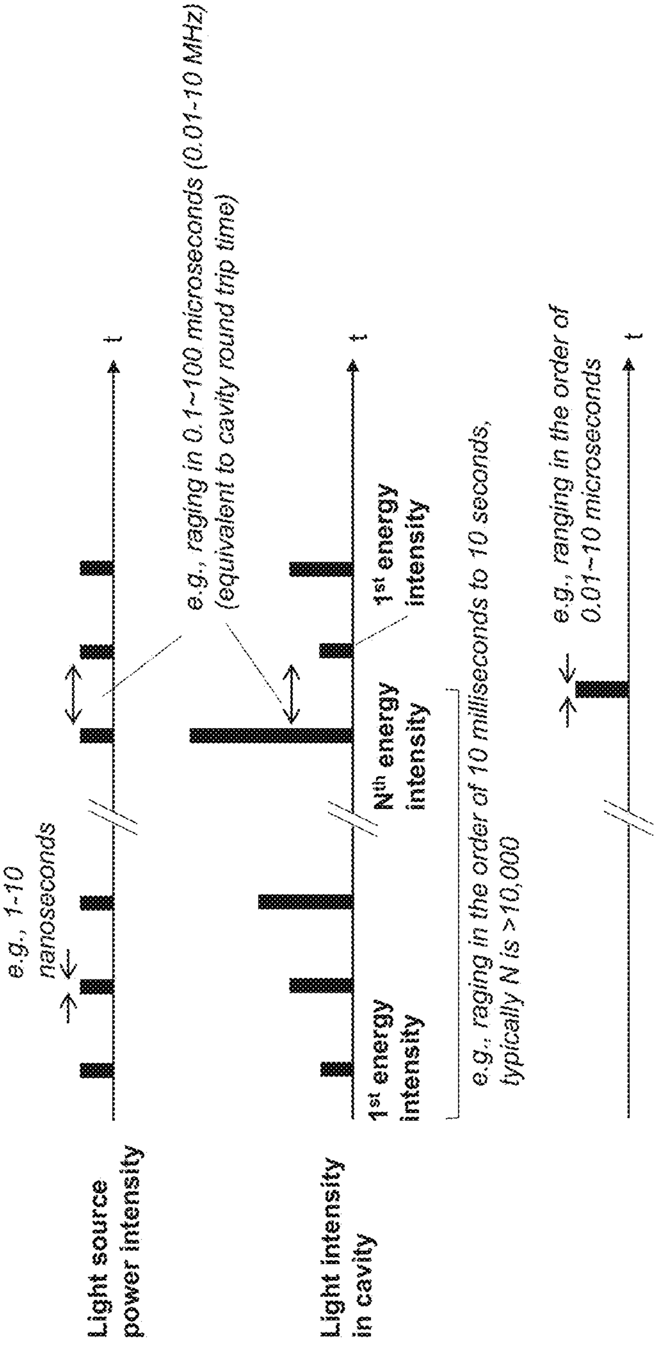
FIG. 11 is a timing diagram for generating a high intensity pulse laser in an example of the present invention.

FIG. 11 is a timing diagram for generating a high intensity pulse laser in an example of the present invention. As shown in the first line labelled "Light source power intensity," each laser pulse from the light source has a pulse in a nanosecond range, e.g., 1-10 nanoseconds. Light intensity in the cavity increases in intensity with each pulse from the source from a first energy intensity, a second energy intensity, to an Nth energy intensity, where N is 1,000 or greater, but can be fewer or more depending upon the application. Once the high intensity pulse is dumped or redirected to a second path, the process continues from the beginning with a first energy intensity, a second energy intensity to an Nth energy intensity. The cavity dumper action to dump laser beam after Nth energy intensity is achieved is illustrate on the bottom line, which shows a pulse ranging in a 0.01 to 10 micro-seconds range, but can be others. The laser beam that is dumped is a high intensity pulse laser that has a much higher intensity than the original intensity from the laser light source.

In an example, the present high intensity pulse laser system can be configured with a laser fusion system for generating energy. As an example, laser fusion is a process that uses lasers to initiate and sustain a nuclear fusion reaction, which is a process that releases energy by combining atomic nuclei. This process has the potential to provide a virtually limitless and clean source of energy. In laser fusion, a beam of high-energy lasers is used to create a plasma, which is a hot, ionized gas that is composed of free electrons and atomic nuclei. The plasma is then compressed and heated to extremely high temperatures and pressures, causing the atomic nuclei to fuse together and release energy. An example of laser fusion is inertial confinement fusion (ICF). In ICF, a laser beam is used to create a shock wave that compresses a small pellet of fusion fuel. Further details of laser fusion are described in more detail below.

Figure 12:
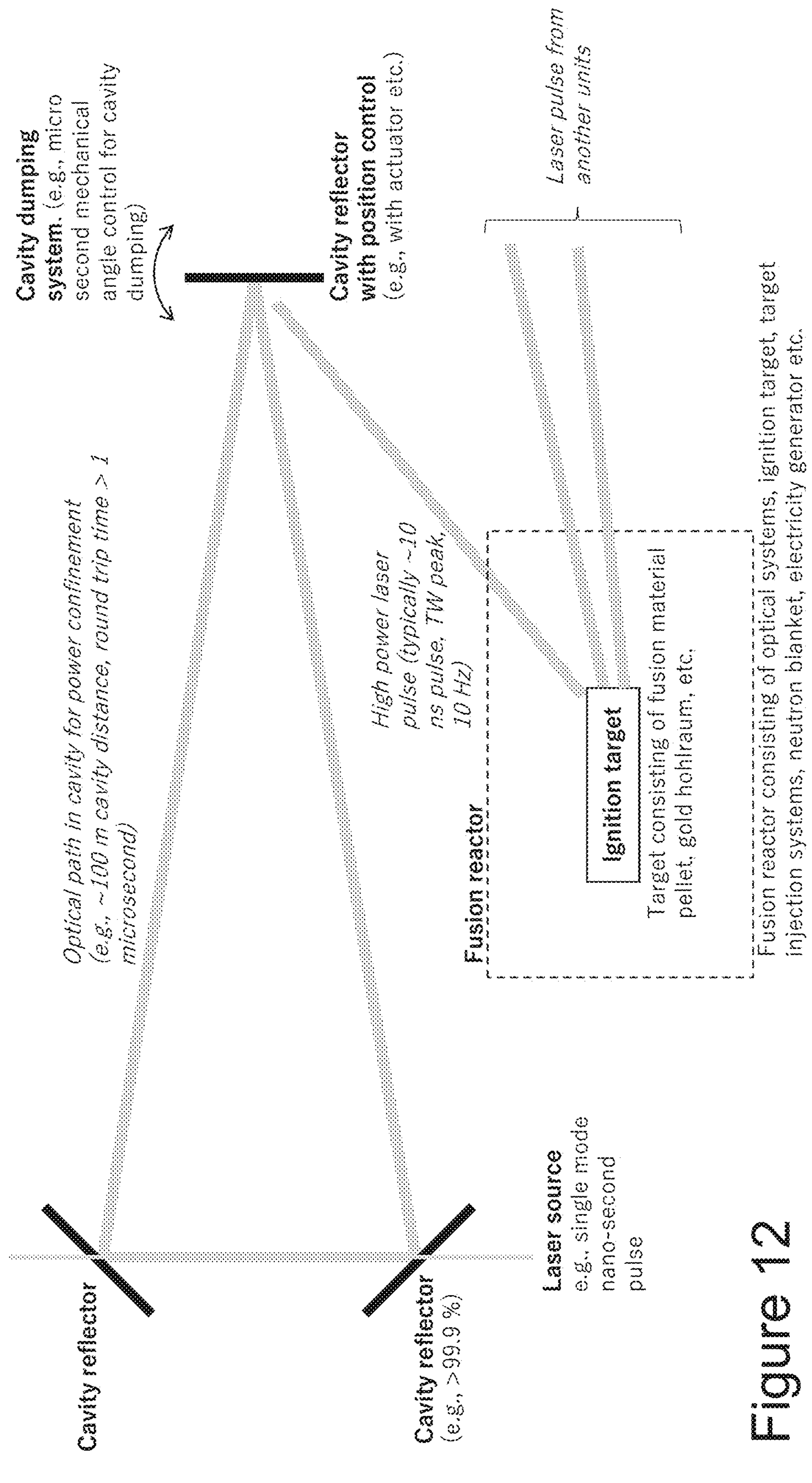
FIG. 12 is a simplified diagram illustrating a fusion system configured to a high intensity pulse laser system according to an example of the present invention.

FIG. 12 is a simplified diagram illustrating a fusion system configured to a high intensity pulse laser system according to an example of the present invention. As shown, the fusion system has a fusion material, e.g., pellet, configured within a reactor. The fusion system can be configured with multiple lasers from different sources.

Figure 13:
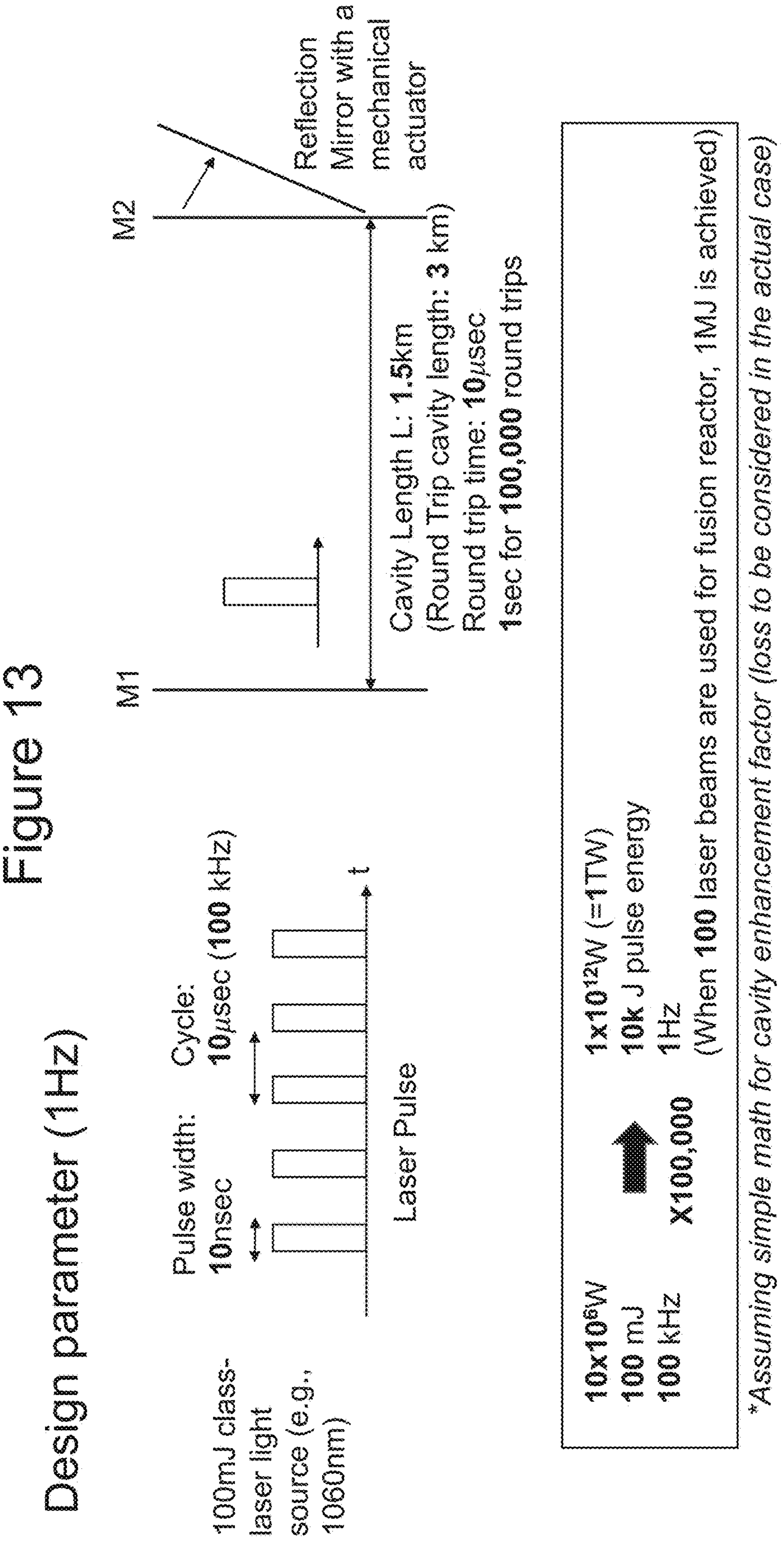
FIGS. 13 to 15 illustrate timing diagrams showing a high intensity pulse laser output according to examples of the present invention.
Figure 14:
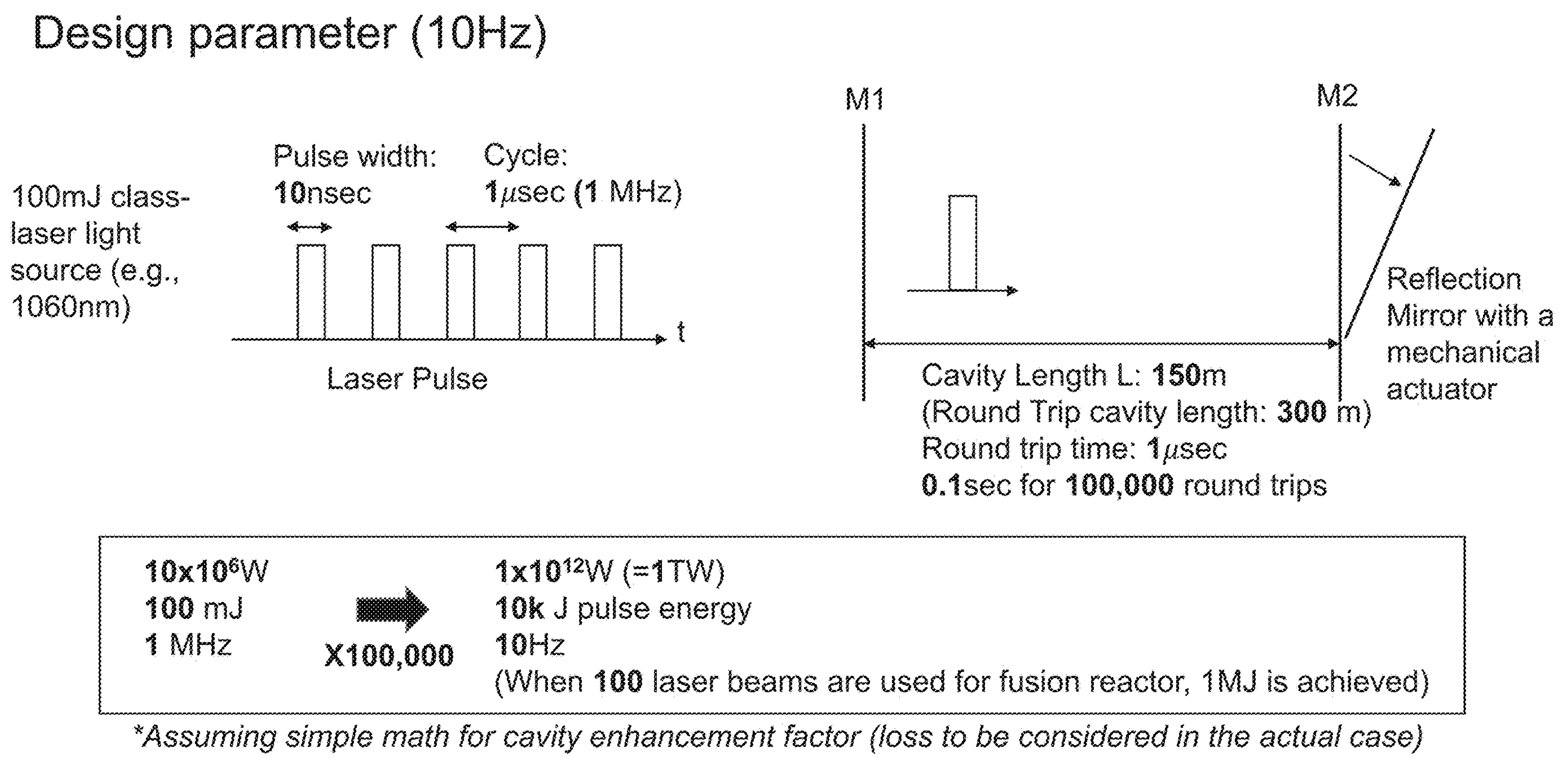
Figure 15:
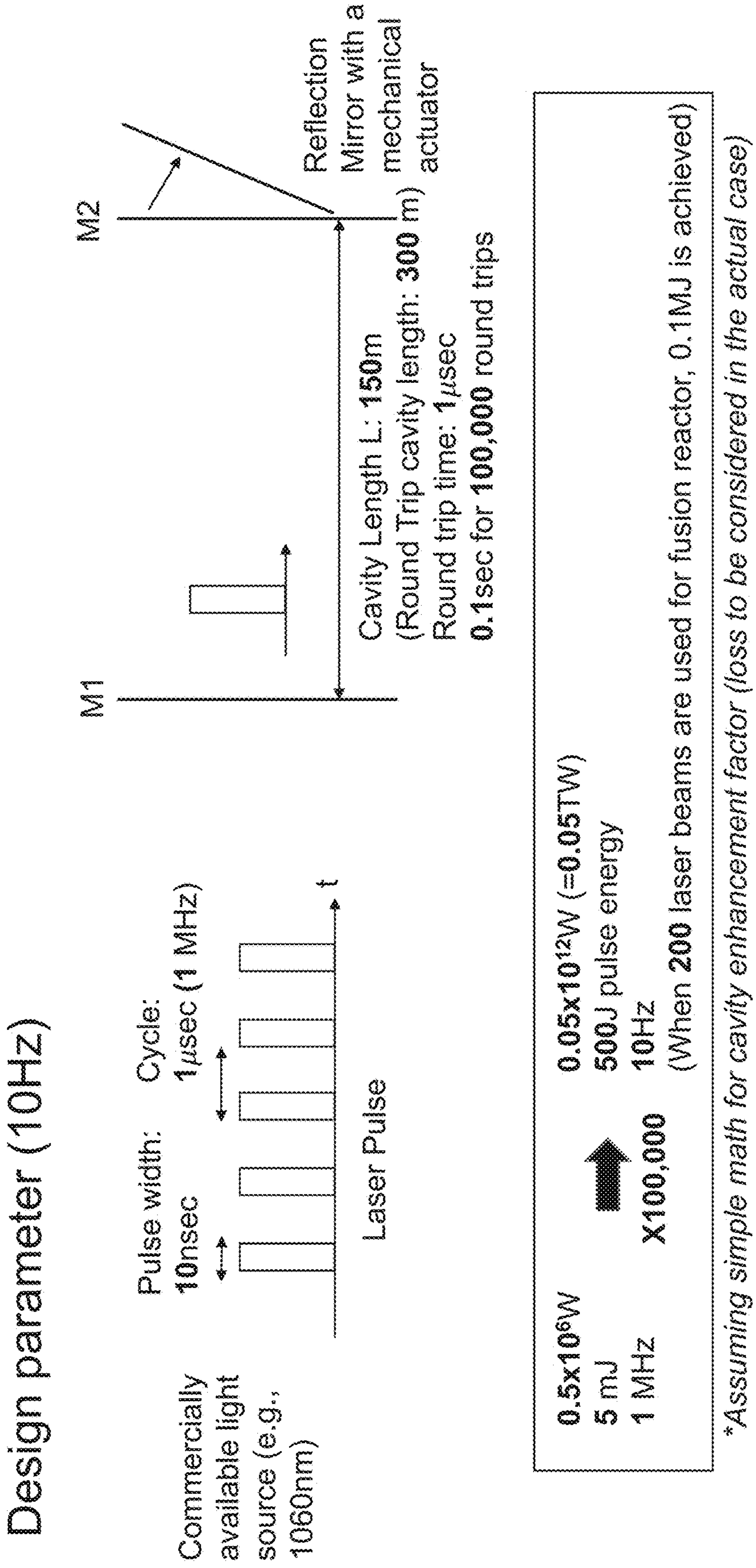

FIGS. 13 to 15 illustrate timing diagrams showing a high intensity pulse laser output according to examples of the present invention. As show in an example of FIG. 13, a one (1) Mega Joule class laser source is included. The laser source is configured for, for example, 1060 nm but can be other wavelengths. The laser pulse has a length of ten (10) nanoseconds. The cycle is ten (10) micro-seconds (or 100 kHz). In an example, one hundred thousand (100,000) cycles or round trips are generating in a cavity according to the present invention. The cavity length is, for example, 1.5 kilometer equating to a round trip cavity length of three (3) kilometers. The round trip time is ten (10) micro-seconds, and one seconds creates one hundred thousand round trips. For the one hundred thousand round trips, we generate $1\times10^{12}$ Watts (or 1 Terra Watt) or ten (10) Kilo Joules of pulse energy at one (1) Hz. When one hundred laser beams are used together for a fusion reactor, one Mega Joule is achieved.

As show in an example of FIG. 14, a one (1) Mega Joule class laser source is included. The laser source is configured for, for example, 1060 nm but can be other wavelengths. The laser pulse has a length of ten (10) nanoseconds. The cycle is one (1) micro second (or 1 MHz). In an example, one hundred thousand (100,000) cycles or round trips are generating in a cavity according to the present invention. The cavity length is, for example, one hundred fifty (150) meters equating to a round trip cavity length of three hundred (300) meters. The round-trip time is one (1) micro second, and one tens (1/10) of a second creates one hundred thousand round trips. For the one hundred thousand round trips, we generate $1\times10^{12}$ Watts (or 1 Terra Watt) or ten (10) Kilo Joules of pulse energy at ten (10) Hz. When one hundred laser beams are used together for a fusion reactor, one Mega Joule is achieved. For continuous laser fusion or commercially available laser fusion, Mega Joule pulse is required at 10 Hz repetition rate in an example. Using present invention, it is possible to make the Mega Joule pulse with the repetition rate of 10 Hz by using a laser source with 100 mJ of pulse energy and 1 MHz repetition rate. Presently, Lawrence Livermore National laboratory could generate only one pulse with a Mega Joule energy per day.

As show in an example of FIG. 15, a commercially available class laser source ($0.5\times10^{6}$ W) is included. The laser source is configured for, for example, 1060 nm but can be other wavelengths. The laser pulse has a length of ten (10) nanoseconds. The cycle is one (1) micro-seconds (or 1 MHz). In an example, one hundred thousand (100,000) cycles or round trips are generating in a cavity according to the present invention. The cavity length is, for example, one hundred fifty (150) meters equating to a round trip cavity length of three hundred (300) meters. The round-trip time is one (1) micro second, and one tens of a second creates one hundred thousand round trips. For the one hundred thousand round trips, we generate $0.05\times10^{12}$ Watts (or 0.05 Terra Watt) or five hundred (500) Joules of pulse energy at 10 Hz. When two hundred laser beams are used together for a fusion reactor, one tenth (0.1) Mega Joule is achieved.

In an example, the present invention provides a reactor system for a space application. The system has a reactor comprising a fusion material, and at least one satellite system positioned in an orbit above a geographical location of a planet. In an example, the satellite system is operably coupled to the reactor including the fusion material.

In an example, the system has an optical cavity being maintained in a vacuum of 300 Torr and less and characterized by a length of free space of 50 meters to 10 kilometers and positioned with the satellite system. In an example, the optical cavity is configured to increase an intensity of a laser beam comprising a pulse from a certain of energy power intensity to a higher energy power intensity propagating on a first optical path by circulating or reciprocating at least a portion of the laser beam from a light source having a pulse energy output power of 0.001 milli Joule to 1 Mega Joule on the first optical path.

In an example, the system has an optical path modification device coupled to the optical cavity. In an example, the optical path modification device is configured to repeatedly change a spatial direction of the laser beam propagating on the first optical path at a predetermined timing ranging from 0.001 microseconds to 3 seconds with the response time from 1 picosecond to 30 microseconds to cause the laser beam propagating on the first optical path to change a direction to a second optical path that is outside of the first optical path to interact with the fusion material after using a several of mirrors and lens. The optical path modification device is configured to propagate the laser beam on the second optical path generating a high intensity pulse laser.

In an example, the system has at least a pair of mirror devices. At least one of the mirror devices is configured on the satellite system. In an example, each of the mirror devices has a mirror surface area of 1 $cm^2$ and 100,000 $m^2$, and is configured with the optical path modification device and provided within the first optical path. In an example, at least one the mirror device is configured to change a spatial position of the mirror device being coupled to the propagation of the laser beam.

In another example, the present system includes a high-speed rotation motor configured to change the direction of the propagation of the laser beam from the first optical path to a second optical path, or any other desirable optical path.

In an example, the system has a timing device configured with the optical path mechanism and having a predetermined frequency to adjust the spatial position of the mirror device such that the timing device is configured to adjust the spatial position of the mirror device after a predetermined number of cycles of the laser beam between at least the pair of mirrors such that each cycle of the laser beam progressively increases an intensity of a pulse of the laser beam.

In an example, the system has a spatial driver device coupled to the timing device and the at least one mirror device configured to adjust the spatial position of the mirror device to move the spatial position of the mirror device from a first position to a second position after the predetermined number of cycles.

In an example, the optical path modification device includes a nonlinear optical element that converts a pulse photon energy of laser beam input into a nearly doubled or tripled pulse photon energy of laser beam.

In an example, the fusion material contains elements with a proton number of 10 or less. In an example, the fusion material contains at least one of deuterium and tritium with a proton number of one.

In an example, the reactor comprises at least one radiation output body and a material housing. In an example, the radiation output body is configured to output a pulsed electromagnetic wave having a wavelength of at least X-rays or shorter when irradiated by the high intensity pulsed laser, such that the fusion material is configured to cause the fusion reaction when irradiated with the pulsed electromagnetic waves, and the material housing section is configured to house the radiation output body and the fusion material, and to enable irradiation of the high-intensity pulse laser to the housed radiation output body.

In an example, the system has a neutron absorption unit and a power generation unit such that the neutron absorber is configured to generate thermal energy by absorbing at least a neutron beam of radiation produced from the fusion material by a fusion reaction and such that the power generation unit is configured to be able to convert the heat generated into electrical energy.

In an example, the system has a supply unit configured to provide an electrical energy to at least the laser light source.

In an example, the high intensity pulse laser beam irradiates the fusion material directly or indirectly.

In an example, the spatial driver device comprises a magneto strictive material that is in mechanical contact with a backside of the mirror devices that is adjusted or monolithically integrated with the backside of the mirror device. In an example, the mechanical contact is made using a surface region of the magneto strictive material and a backside of the mirror device, the mechanical contact between the surface region of the magneto strictive material and the backside surface are substantially matched in area.

In an example, the magneto strictive material is characterized by a thickness of a volume structure configured to spatially changed along a plane of the magneto strictive material parallel to and facing a backside of the mirror device by modulating a magnetic field spatially with and coupled to the magnetic strictive material such that the mirror device is configured to tilt from a first angle to a second angle measured from a direction normal to the mirror surface area of the mirror device; wherein the first angle to the second angle ranges from 0.1 degree to 5 degrees.

In an example, the magneto strictive material is characterized by a thickness of a volume structure configured to change from a first thickness to a second thickness along an entire volume provided between a first surface region and a second surface region of the magneto strictive material coupled to a backside of the mirror device by applying a uniform magnetic field to the magnetic strictive material such that the mirror device changes a position of the laser beam from the first optical path to the second optical path by changing a spatial location of an incidence of the laser beam on the mirror device from a first location of the mirror surface area to a second location of the mirror surface area.

In an example, the pair of mirrors comprise, respectively, a flat mirror device and a curved mirror device. In an example, the flat mirror is adjusted with the magneto strictive material, and the curved mirror device is configured with the first mirror device to change the direction of the laser beam from the first optical path to the second optical path.

In an example, the laser beam of the light source has a wavelength range from 1020 nm to 1070 nm. Each of the mirror devices has a reflectance to the laser beam of 99.99% or more in an example.

In an example, the light source comprises a semiconductor laser light source containing an AlInGaN-based compound. Other light sources can also be used depending upon the application.

In an example, the pulse intensity of laser beam generated is at least $10^3$ times greater than a pulse intensity of the laser beam from the light source.

In an example, the optical path modification device is configured such that an optical element of a mirror is capable of changing a direction of propagation of the laser beam repeatedly enters and withdraws from the first optical path, thereby causing the laser beam propagating on the first optical path to the optical element changes the laser beam to the second optical path. In an example, the optical element of mirror is configured to repeatedly enter and withdraw from the first optical path by rotating about a rotation center axis or off axis to extract the laser beam to second optical path by changing the direction of the laser beam of the first optical path.

In an example, the present invention provides a high intensity short pulse laser generation system for a space application. The system has a first satellite system capable of being positioned in an orbit above a geographical location of a planet and a second satellite system within a vicinity of the first satellite system.

In an example, the system has an optical cavity being maintained in a vacuum of 300 Torr and less and characterized by a length of free space of 10 meters to 10 kilometers and positioned with the aerospace vehicle, the optical cavity being configured to increase an intensity of a laser beam comprising a pulse from a certain of energy power intensity to a higher energy power intensity propagating on a first optical path by circulating or reciprocating at least a portion of the laser beam from a light source having a pulse energy output power of 0.001 millijoule to 1 Mega Joule on the first optical path.

In an example, the system has an optical path modification device coupled to the optical cavity, the optical path modification device being configured to repeatedly change a spatial direction of the laser beam propagating on the first optical path at a predetermined timing ranging from 0.001 microseconds to 3 seconds with the response time from 1 picosecond to 30 microseconds to cause the laser beam propagating on the first optical path to change a direction to a second optical path that is outside of the first optical path to interact with the fusion material after using a several of mirrors and lens. In an example, the optical path modification device is configured to propagate the laser beam on the second optical path generating a high intensity pulse laser to interact with the fusion material. In an example, the optical path modification device is configured such that an optical element of mirror capable of changing a direction of propagation of the laser beam repeatedly enters and withdraws from the first optical path, thereby causing the laser beam propagating on the first optical path to the optical element of mirror changes the laser beam to the second optical path.

In an example, the system has at least a pair of mirror devices. In an example, at least one of the mirror devices is configured on the satellite system. Each of the mirror devices has a mirror surface area of 1 $cm^2$ and 100000 $m^2$, and configured with the optical path modification device and provided within the first optical path. In an example, at least one the mirror device configured to change a spatial position of the mirror device being coupled to the propagation of the laser beam.

In an example, the system has a timing device configured with the optical path mechanism and having a predetermined frequency to adjust the spatial position of the mirror device such that the timing device is configured to adjust the spatial position of the mirror device after a predetermined number of cycles of the laser beam between at least the pair of mirrors such that each cycle of the laser beam progressively increases an intensity of a pulse of the laser beam.

In an example, the system has a spatial driver device coupled to the timing device and the at least one mirror device configured to adjust the spatial position of the mirror device to move the spatial position of the mirror device from a first position to a second position after the predetermined number of cycles.

In an example, the present invention provides a high intensity short pulse laser generation system for a space application. The system has a first satellite system capable of being positioned in an orbit above a geographical location of a planet and a second satellite system within a vicinity of the first satellite system. The system also has a laser generation system coupled to the first satellite system.

In an example, the laser generation system has an optical cavity being maintained in a vacuum of 300 Torr and less and characterized by a length of free space of 50 meters to 10 kilometers and positioned with the first satellite system, the optical cavity being configured to increase an intensity of a laser beam comprising a pulse from a certain of energy power intensity to a higher energy power intensity propagating on a first optical path by circulating or reciprocating at least a portion of the laser beam from a light source having a pulse energy output power of 0.001 millijoule to 1 Mega Joule on the first optical path In an example the system has an optical path modification device coupled to the optical cavity, the optical path modification device being configured to repeatedly change a spatial direction of the laser beam propagating on the first optical path at a predetermined timing ranging from 0.001 microseconds to 3 seconds with the response time from 1 picosecond to 30 microseconds to cause the laser beam propagating on the first optical path to change a direction to a second optical path that is outside of the first optical path thereby the optical path modification device is configured to propagate the laser beam on the second optical path generating a high intensity pulse laser, the optical path modification device being configured such that an optical element is capable of changing a direction of propagation of the laser beam repeatedly by entering and withdrawing from the first optical path, thereby causing the laser beam propagating on the first optical path changing the laser beam to the second optical path.

In an example, the system has at least a pair of mirror devices, at least one of the mirror devices configured on the satellite system, each of the mirror devices having a mirror surface area of 1 $cm^2$ and 100000 $m^2$, and configured with the optical path modification device and provided within the first optical path, at least one the mirror device configured to change a spatial position of the mirror device being coupled to the propagation of the laser beam.

In an example, the system has a timing device configured with the optical path mechanism and having a predetermined frequency to adjust the spatial position of the mirror device such that the timing device is configured to adjust the spatial position of the mirror device after a predetermined number of cycles of the laser beam between at least the pair of mirrors such that each cycle of the laser beam progressively increases an intensity of a pulse of the laser beam.

In an example, the system has a spatial driver device coupled to the timing device and the at least one mirror device configured to adjust the spatial position of the mirror device to move the spatial position of the mirror device from a first position to a second position after the predetermined number of cycles.

In an example, the optical element is configured to repeatedly enter and withdraw from the first optical path by rotating about a rotation center axis of off axis extending in the first direction.

While the above is a full description of the specific examples, various modifications, alternative constructions and equivalents may be used. As an example, the packaged device can include any combination of elements described above, as well as outside of the present specification. Therefore, the above description and illustrations should not be taken as limiting the scope of the present invention which is defined by the appended claims.

The invention claimed is:

1. A reactor system for a space application, the system comprising:

a reactor comprising a fusion material;

at least one satellite system positioned in an orbit above a geographical location of a planet, the satellite system being operably coupled to the reactor including the fusion material;

an optical cavity being maintained in a vacuum of 300 Torr or less and characterized by a length of free space of 10 meters to 10 kilometers and positioned with the satellite system, the optical cavity being configured to increase an intensity of a laser beam comprising a pulse from a certain value of energy power intensity to a higher value of energy power intensity propagating on a first optical path by circulating or reciprocating at least a portion of the laser beam from a light source having a pulse energy output power of 0.001 millijoule to 1 megajoule on the first optical path;

an optical path modification device coupled to the optical cavity, the optical path modification device being configured to repeatedly change a spatial direction of the laser beam propagating on the first optical path at a predetermined timing ranging from 0.001 microseconds to 3 seconds with a response time from 1 picosecond to 30 microseconds to cause the laser beam propagating on the first optical path to change a direction to a second optical path that is outside of the first optical path to interact with the fusion material after using at least a pair of mirror devices, and, thereby, the optical path modification device is configured to propagate the laser beam on the second optical path generating a high intensity pulse laser;

at least one of the mirror devices being configured on the satellite system, each of the mirror devices having a mirror surface area of 1 $cm^2$ to 100,000 $m^2$ and configured with the optical path modification device and provided within the first optical path, at least one the mirror device configured to change a spatial position of the mirror device being coupled to the propagation of the laser beam;

a timing device configured with the optical path mechanism and having a predetermined frequency to adjust the spatial position of the mirror device such that the timing device is configured to adjust the spatial position of the mirror device after a predetermined number of cycles of the laser beam between at least the pair of mirrors such that each cycle of the laser beam progressively increases an intensity of a pulse of the laser beam; and a spatial driver device coupled to the timing device and the at least one mirror device, the spatial driver device configured to adjust the spatial position of the mirror device to move the spatial position of the mirror device from a first position to a second position after the predetermined number of cycles.

2. The system of claim 1 wherein the optical path modification devices includes a nonlinear optical element that converts a pulse photon energy of the laser beam input into a nearly doubled or tripled pulse photon energy of laser beam.

3. The system of claim 1 wherein the fusion material contains elements with a proton number of 10 or less.

4. The system of claim 1 wherein the fusion material contains at least one of deuterium and tritium with a proton number of one.

5. The system of claim 1 wherein the reactor comprises at least one radiation output body and a material housing, the radiation output body being configured to output a pulsed electromagnetic wave having a wavelength of at least X-rays or shorter when irradiated by the high intensity pulsed laser, such that the fusion material is configured to cause a fusion reaction when irradiated with the pulsed electromagnetic waves, and the material housing section is configured to house the radiation output body and the fusion material, and to enable irradiation of the high-intensity pulse laser to the housed radiation output body.

6. The system of claim 1 further comprising a neutron absorption unit and a power generation unit such that a neutron absorber is configured to generate thermal energy by absorbing at least a neutron beam of radiation produced from the fusion material by a fusion reaction and such that the power generation unit is configured to be able to convert the heat generated into electrical energy.

7. The system of claim 1 further comprising a supply unit configured to provide an electrical energy to at least the laser light source.

8. The system of claim 1 wherein the high intensity pulse laser beam irradiates the fusion material directly or indirectly.

9. The system of claim 1 wherein the spatial driver device comprises a magnetostrictive material that is in mechanical contact with a backside of the mirror devices that is adjusted or monolithically integrated with the backside of the mirror device.

10. The system of claim 9 wherein when the mechanical contact is made using a surface region of the magnetostrictive material and the backside of the mirror device, the mechanical contact between the surface region of the magneto strictive material and the backside surface are substantially matched in area.

11. The system of claim 9 wherein the magnetostrictive material is characterized by a thickness of a volume structure configured to spatially changed along a plane of the magneto strictive material parallel to and facing the backside of the mirror device by modulating a magnetic field spatially with and coupled to the magnetostrictive material such that the mirror device is configured to tilt from a first angle to a second angle measured from a direction normal to the mirror surface area of the mirror device; and wherein the first angle to the second angle ranges from 0.1 degree to 5 degrees.

12. The system of claim 9 wherein the magnetostrictive material is characterized by a thickness of a volume structure configured to change from a first thickness to a second thickness along an entire volume provided between a first surface region and a second surface region of the magneto strictive material coupled to the backside of the mirror device by applying a uniform magnetic field to the magnetostrictive material such that the mirror device changes a position of the laser beam from the first optical path to the second optical path by changing a spatial location of an incidence of the laser beam on the mirror device from a first location of the mirror surface area to a second location of the mirror surface area.

13. The system of claim 1 wherein the pair of mirrors comprise, respectively, a flat mirror device and a curved mirror device, the flat mirror device being adjusted with a magnetostrictive material, and the curved mirror device being configured with the first mirror device to change the direction of the laser beam from the first optical path to the second optical path.

14. The system of claim 1 wherein the laser beam of the light source has a wavelength range from 1020 nm to 1070 nm; and wherein each of the mirror devices has a reflectance to the laser beam of 99.9% or more.

15. The system of claim 1 wherein the light source comprises a semiconductor laser light source containing an AlInGaN-based compound.

16. The system of claim 1, wherein the pulse intensity of laser beam generated is at least $10^3$ times greater than a pulse intensity of the laser beam from the light source.

17. The system of claim 1 wherein the optical path modification device is configured such that an element is capable of changing a direction of propagation of the laser beam by repeatedly entering and withdrawing from the first optical path, thereby causing the laser beam propagating on the first optical path to change the direction of the laser beam to the second optical path.

18. The system of claim 17 wherein the element is configured to repeatedly enter and withdraw from the first optical path by rotating about a rotation center axis or off axis to extract the laser beam to second optical path by changing the direction of the laser beam of the first optical path.

* * * * *